United States Patent
Yang et al.

[11] Patent Number: 6,154,190
[45] Date of Patent: *Nov. 28, 2000

[54] DYNAMIC DRIVE METHODS AND APPARATUS FOR A BISTABLE LIQUID CRYSTAL DISPLAY

[75] Inventors: Deng-Ke Yang, Hudson; Yang-Ming Zhu; Xiao-Yang Huang, both of Kent, all of Ohio

[73] Assignee: Kent State University, Kent, Ohio

[ * ] Notice: This patent is subject to a terminal disclaimer.

[21] Appl. No.: 08/852,319

[22] Filed: May 7, 1997

Related U.S. Application Data

[63] Continuation-in-part of application No. 08/390,068, Feb. 17, 1995, Pat. No. 5,748,277.

[51] Int. Cl.$^7$ .................................................. G09G 3/36
[52] U.S. Cl. ................................................ 345/94; 345/95
[58] Field of Search .................................. 345/94, 97, 87, 345/89, 208, 96, 99, 95; 349/33, 96, 177, 86, 169, 168, 141

[56] References Cited

U.S. PATENT DOCUMENTS

| | | | |
|---|---|---|---|
| 4,317,115 | 2/1982 | Kawakami et al. | 359/55 |
| 4,514,045 | 4/1985 | Huffman et al. | 349/21 |
| 4,626,074 | 12/1986 | Crossland et al. | 349/65 |
| 4,636,788 | 1/1987 | Hilbrink | 345/91 |
| 4,641,135 | 2/1987 | Hilbrink | 345/98 |
| 4,668,049 | 5/1987 | Canter et al. | 349/65 |
| 4,701,026 | 10/1987 | Yazaki et al. | 345/97 |
| 4,705,345 | 11/1987 | Ayliffe et al. | 345/97 |
| 4,728,175 | 3/1988 | Baron | 349/50 |
| 4,761,058 | 8/1988 | Okubo et al. | 345/87 |
| 4,769,639 | 9/1988 | Kawamura et al. | 345/95 |
| 4,864,538 | 9/1989 | Buzak | 345/87 |
| 4,909,607 | 3/1990 | Ross | 345/94 |
| 4,958,915 | 9/1990 | Okada et al. | 345/97 |
| 5,036,319 | 7/1991 | Buzak | 345/74 |
| 5,132,823 | 7/1992 | Kamath et al. | 349/68 |
| 5,168,378 | 12/1992 | Black et al. | 349/86 |
| 5,168,380 | 12/1992 | Fergason | 349/26 |
| 5,189,535 | 2/1993 | Mochizuki et al. | 359/55 |
| 5,251,048 | 10/1993 | Doane et al. | 345/88 |
| 5,252,954 | 10/1993 | Nagata et al. | 345/210 |
| 5,260,699 | 11/1993 | Lister et al. | 345/97 |

(List continued on next page.)

FOREIGN PATENT DOCUMENTS 0 613 116 A2  8/1994  European Pat. Off. .

OTHER PUBLICATIONS

Huang et al., *Transient dielectric study of Bistable reflective cholesteric displays and design of rapid drive scheme*, Appl. Phys. Lett. 67(9) (Aug. 28, 1995), pp. 1211–1213.

Huang et al., *High–Performance Dynamic Drive Scheme for Bistable Reflective Cholesteric Displays*, SID Digest, vol. XXVII (May 12–17, 1996), pp. 359–362.

Zhu and Yang, *High–Speed Dynamic Drive Scheme for Bistable Reflective Cholestric Displays*, SID Digest (May 13, 1997), pp. 97–100.

Hashimoto et al., *Invited Paper: Reflective Color Display Using Cholestric Liquid Crystals*, SID Digest vol. XXIX (May 17–22, 1998), pp. 897–900.

*Primary Examiner*—Jeffery Brier
*Attorney, Agent, or Firm*—Renner, Kenner, Greive, Bobak, Taylor & Weber

[57] ABSTRACT

A flat-panel liquid crystal display. The display includes a flat sheet of bistable chiral nematic liquid crystal material activated by a drive circuit that individually controls the display state of multiple picture elements. The driver circuitry activates the liquid crystal domains with various drive schemes which have any number of different phases to attain various addressing sequence times. At the end of each drive scheme, the texture of the liquid crystal material is allowed to provide either focal conic or twisted planar end states across the two-dimensional array of picture elements. Each drive scheme employs at least a preparation phase and a selection phase to predispose the liquid crystal material to one of the end states.

52 Claims, 22 Drawing Sheets

U.S. PATENT DOCUMENTS

| | | | |
|---|---|---|---|
| 5,274,484 | 12/1993 | Mochizuki et al. | 345/89 |
| 5,280,280 | 1/1994 | Hotto | 345/98 |
| 5,285,214 | 2/1994 | Bowry | 345/97 |
| 5,287,175 | 2/1994 | Kawagishi | 359/84 |
| 5,289,300 | 2/1994 | Yamazaki et al. | 349/93 |
| 5,293,261 | 3/1994 | Shashidhar et al. | 349/183 |
| 5,315,101 | 5/1994 | Hughes et al. | 250/208.1 |
| 5,384,067 | 1/1995 | Doane et al. | 349/86 |
| 5,488,499 | 1/1996 | Tanaka et al. | 359/102 |
| 5,627,457 | 5/1997 | Ishiyama et al. | 345/94 |
| 5,684,503 | 11/1997 | Nomura et al. | 345/97 |
| 5,703,615 | 12/1997 | Usami | 345/94 |
| 5,748,377 | 5/1998 | Huang et al. | 349/169 |

DYNAMIC DRIVE METHODS AND APPARATUS FOR A BISTABLE LIQUID CRYSTAL DISPLAY

CROSS REFERENCE TO RELATED APPLICATION

This a continuation-in-part application of Ser. No. 08/390,068 filed Feb. 17, 1995, U.S. Pat. No. 5,748,277, entitled "Dynamic Drive Method and Apparatus for a Bistable Liquid Crystal Display."

The United States Government has a paid-up license in this invention and may have the right in limited circumstances to require the patent owner to license others on reasonable terms as provided for by the terms of Contract No. N61331-94-K-0042, awarded by the Advanced Research Projects Agency.

FIELD OF THE INVENTION

The present invention concerns a visual display utilizing a chiral nematic, also called cholesteric, reflective bistable liquid crystal material and an electronics drive system for activating the display using efficient operation to provide high-speed updating of the display.

BACKGROUND ART

Liquid crystals have been used to display information in flat-panel displays for many years, such as are commonly used in watch faces or half page size displays for lap-top computers and the like.

One current display technology is the super twisted nematic (STN) type. Although these types of devices are relatively inexpensive, they are limited in the number of lines that can be addressed because of the steepness of their electro-optic curve and the tight voltage tolerances that need to be maintained. Even though the technology is now highly developed current devices are limited to approximately 500 lines. These displays also have the drawback of requiring polarizers, which limits brightness, and require glass substrates which increase the weight of the display and are susceptible to breakage. Another current display technology is the so called thin film transistor (TFT) type. In these devices, the liquid crystal electro-optical element is driven by a thin film transistor that is present at each pixel in a so called active matrix. These types of displays are expensive to manufacture. As the size of the existing half page TFT displays is increased to full page size, the number of transistors and the area of substrate increase by a factor of two and, at the current time, this results in an unacceptable expense.

Thus, a principal shortcoming of the current generation of displays is that they are inherently limited to half page, rather than full page capability. Accordingly, there is still a need for a technology that enables cost effective page size displays that can be updated at page turn rates.

Liquid crystal displays made up of bistable chiral nematic materials do not require continuous updating or refreshing. When data or information changes on the display, the electronics update the display. If, however, the display information does not change, the display can be written once and remain in its information-conveying configuration for extended periods without display processor intervention. The ability to remain in a stable state for an extended period has resulted in use of chiral nematic liquid crystal displays for signs that can be slowly updated over relatively long periods of time. Since the display information does not change, the fact that it may take longer to write the initial information to the display is not important.

Advantageously, chiral nematic bistable devices can be prepared that have no limit to the number of lines that can be addressed, making them excellent candidates to provide the needed page size displays. However, the update rate of these displays is far too slow for many page size display applications such as electronic manuals or electronic news papers and the like. For these types of applications, the device needs to be addressed in about 1 second or less to be comparable with the time required to turn a page manually. However, the update refresh rate of the current chiral nematic display technology is greater than 10 seconds for a 1000 line page size display. Clearly, there is a need for a commercially viable display for use in information-conveying devices such as page size viewers, electronic books, pagers and telephone displays, and signs that must be addressed more quickly. Updating information on a passive matrix liquid crystal display at rates fast enough to convey information in a commercially acceptable manner of, for example, 1 second or less has presented a problem to prior art liquid crystal displays.

A number of prior art patents address problems in updating liquid crystal display information. So-called liquid crystal display drivers or electronic circuits are known in the prior art and utilize various techniques for updating a liquid crystal display. U.S. Pat. No. 5,251,048 which issued Oct. 5, 1993 to Doane et al. concerns a method and apparatus for electronic switching of a reflective color display system. This patent discloses use of a liquid crystal light-modulating material that is confined between substrates. Elongated conductive paths supported on opposite sides of the substrates activate picture elements at controlled locations to set up a display screen. The disclosure of the '048 patent to Doane et al. is incorporated herein by reference.

A paper entitled "Storage Type Liquid Crystal Matrix Display" to Tani et al. (SID 79 Digest, p. 114–115) proposes a liquid crystal display driver system whose operation takes into account transitions between various states of a chiral nematic liquid crystal material. The paper describes a new storage type liquid crystal display having the advantages of long storage time which makes refreshing or updating of the information on the display unnecessary. However, the Tani et al. drive scheme is limited in its resolution and information density conveying ability. His drive waveform and technology are limited in the number of lines that can be addressed to roughly 100 lines, far less than the 1000 lines required for page size viewer applications. Also, his demonstrated writing times of greater than 8 ms per line are insufficient for commercially acceptable page size viewers. On a flat-panel display or the like, 100 lines of information in a liquid crystal display is not acceptable for conveying text and 8 ms per line is far too slow for many applications.

DISCLOSURE OF THE INVENTION

A central aspect of this invention is an addressing method for bistable liquid crystal high-resolution, large size display at a page-turn rate. The present invention takes advantage of discoveries concerning transitions from one optical state or texture to another of a bistable chiral nematic liquid crystal material. Rapid switching times achieved through practice of the invention make possible the use of bistable chiral nematic liquid crystals in passive matrix systems having address rates of more than 1000 scan lines per second. Such refresh rates are a significant improvement for use in a flat-panel display for a page size viewer, electronic book or the like.

In accordance with the invention, a control is coupled to a display having a layer of bistable chiral nematic liquid crystal material disposed between cell walls. The chiral nematic liquid crystal material is provided in a thin layer and bound by electrodes on opposite sides of the material which selectively activate the picture elements of the display. Such activation causes the liquid crystal to exhibit various liquid crystal textures in response to different field conditions. In particular, and while not wanting to be bound by theory, at higher voltages the liquid crystal assumes the homeotropic texture wherein the liquid crystal director is aligned perpendicular to the cell surface. In the twisted planar, also called Grandjean texture, the liquid crystal is characterized by a helical structure, the pitch length of which depends upon the amount of chiral material present. The helical axes of the twisted planar texture are perpendicular to the cell surface and, depending on the cell, this texture is stable in the absence of a field. In the transient twisted planar (transient Grandjean) texture the pitch length is roughly twice that of the twisted planar texture. This state occurs when an applied field holding the material in the homeotropic texture is suddenly reduced or removed. This state is transient to either the twisted planar or focal conic texture depending upon the conditions present. Finally, there is the focal conic state, where the helical axes are, for the most part, randomly aligned. Depending on the cell this state may also be stable in the absence of a field.

With the bistable chiral nematic liquid crystal for use in the inventive method, both the planar and focal conic states can exist and both are stable at zero field. The homeotropic state will relax at a sufficiently low field, or zero field, to the transient planar state or to the focal conic state, the former of which will then relax to a planar state or a focal conic state depending on the conditions present. Only the transition from the homeotropic to the transient planar is. especially fast, less than about 2 ms. The bistable display operation of the invention is based on this fact and the optical distinction between the twisted planar and focal conic states. It is the allowance or prevention of the homeotropic to transient planar transition at the appropriate phase in the inventive drive scheme that enables the advantageous results obtained thereby. When the pitch length of the material is adjusted to reflect light in the visible spectrum, the planar state will reflect colored light and the rest of the states will appear transparent or nearly transparent. In a display device wherein the back surface of the cell is painted black, the planar state can be made to reflect light of any desired color depending on the pitch length, and the remaining states will appear black to the observer.

In accordance with a preferred embodiment of the invention, chiral nematic liquid crystal display elements are activated in a series of steps to control their transitions during the refresh or update stage of the display process.

The first step is referred to herein as the preparation phase, during which a pulse or series of pulses causes the liquid crystal within the picture element to align in a homeotropic state. Advantageously, a large number of lines can be simultaneously addressed during the preparation step.

The second step is referred to herein as the selection phase or step. During the selection phase, the voltages applied to the liquid crystal within the picture element are chosen so that the final optical state of the pixel will be either focal conic or twisted planar. In practice the voltage is chosen to either maintain the homeotropic state or reduced enough to initiate a transition to the transient twisted planar state during the selection phase.

The next step is a so-called evolution phase, during which the liquid crystal selected to transform into the transient twisted planar state during the selection step now evolves into a focal conic state and the liquid crystal selected to remain in the homeotropic state during the selection phase continues in the homeotropic state. The voltage level of this evolution phase must be high enough to maintain the homeotropic state and permit the transient planar state to evolve into the focal conic state, but low enough so that the transient planar state does not evolve to the homeotropic state. In another preferred embodiment, a lower voltage may be chosen for the evolution phase, which has the effect of changing the final state that will result from the selection phase. In this embodiment, the evolution voltage applied at the end of the selection phase has a magnitude that allows pixels in the transient twisted planar state to evolve into the twisted planar state, and pixels that are in the homeotropic state to evolve to the focal conic state. Thus, this evolution voltage must be carefully chosen to be high enough so that the homeotropic state does not transform to the transient planar state, but low enough that the transient planar state does not evolve to the focal conic state and the homeotropic state transforms to the focal conic state. Importantly, the drive scheme is implemented using one or the other of a high or low evolution voltage. Whichever evolution voltage is chosen, it is the same for all the pixels. This is to be contrasted with the selection voltage which may change from pixel to pixel.

During a final hold state, the voltage is taken to near zero or removed entirely from the picture element. The liquid crystal domains which are in the focal conic state remain in the focal conic state after removal of the voltages and those in the homeotropic state transform into a stable light reflecting twisted planar state. In the case were the lower evolution voltage is used, any pixels in the focal conic state at the end of the evolution phase will remain in that state, and any pixels in the twisted planar state will remain in that state. Thereafter, the pixels will remain in those states until addressed again. Since all pixels require the same preparation and evolution voltage, the time can be shared during preparation and evolution phases by employing a pipeline algorithm. Multiple lines may be simultaneously addressed with the preparation voltage and then, after selection, multiple lines may be simultaneously addressed with the evolution voltage. When the number of lines to be addressed is large, the average address time per line is equal to the time of the selection phase.

The result of this sequence of pulses or voltages on the liquid crystal that make up a picture element is to select between the focal conic and light reflecting twisted planar state. Of course, the particular voltages necessary for each of the addressing steps will depend on the cell thickness and the particular materials used, and hence will vary from cell to cell. However, the selection of appropriate voltages to implement the inventive drive scheme in a particular cell will be apparent to those of ordinary skill in the art in view of the instant disclosure. A major advantage achieved by practice of the invention is shortening of the selection pulse, thereby increasing the number and thus density of picture elements which can be updated at an acceptable speed. In accordance with the invention, the display can be refreshed at page turning rates on the order of 1 second or less and the resolution and display size can increased to desired values.

In an alternative embodiment, a post-preparation phase is included after the preparation phase to further speed the transition between states. During the post-preparation phase, the voltage applied to the liquid crystal is relatively low to allow the liquid crystal material in a pixel to relax into the transient planar state. By substituting the selection phase of the first embodiment with the post-preparation phase and selection phase of the present embodiment, an additional time savings in the refresh rate of a flat-panel display for a page size viewer is attained.

In yet another alternative embodiment, an after-selection phase is included after the selection phase to further reduce the overall transition time between states. The after-selection phase provides a relatively low voltage value to adjust the polar angle of the liquid crystal material. This facilitates the transition to the texture selected in the selection phase. Incorporation of an after-selection phase further reduces the refresh rate of a flat-panel display for a page size viewer to about 22 ms.

Another embodiment to speed the transition between states of chiral nematic material may be attained in only two steps or phases. A two phase drive scheme for bistable cholesteric liquid crystal display also addresses multiple lines simultaneously to speed the transition between states. The preparation phase applies a voltage to drive the liquid crystal material to a focal conic texture, whereupon a selection phase applies a voltage that ultimately determines the final appearance of the liquid crystal material. A relatively high voltage applied during the selection phase drives the material to a homeotropic texture which relaxes to a reflective planar texture upon removal of the selection voltage. A relatively low voltage applied during the selection phase maintains the material in the weakly scattering focal conic texture which remains after removal of the applied voltage. This provides a much simpler driving waveform while reducing the total time of the addressing sequence to about 16 ms. This shortened addressing sequence allows for video rate operation of a flat-panel display.

In application of any of the above methods, the liquid crystal material is disposed between two cell walls or surfaces so that a small pixel sized region of the liquid crystal material will be sandwiched between one row and one column electrode. The electrodes on either side of the liquid crystal material are activated by a circuit that periodically updates the display. Each picture element of the array is first sequentially energized by a preparation signal. Next, in the second preferred embodiment, the signal is reduced to permit relaxation of the material into the transient planar state. The signal coupled across the picture element is then adjusted during a selection phase for both embodiments. During this selection phase a discrete control voltage is applied to the liquid crystal to select between a pixel that will have a twisted planar (reflecting) or a focal conic (transparent or weakly scattering) state. The signal is then again changed across the picture element during an evolution phase, and finally, the liquid crystal enters its final predetermined state dependent upon the selection voltage.

As is often the convention, one row at a time is "selected" and the state of only the pixels in this row will be affected by the "data" voltages applied to the columns during the selection phase. As a result of the data voltages applied to the columns, pixels in the selected row will then be set to a desired state or texture. However, as is not the convention, specific voltages will also be applied to the row electrode of a particular row both before and after the selection phase for that row. The voltage applied to a row before the selection phase, i.e., during the preparation phase, will be sufficient to write all of the pixels in the row to the homeotropic state. The voltage applied to the row after the selection phase, i.e, during the evolution phase, will be selected to cause the pixels to "evolve" to a desired final state.

The control electronics for activating the liquid crystal display is most preferably a dedicated processor for applying control voltages to row and column arrays of electrodes coupled to the flat-panel display.

A preferred mechanism for activating the orthogonally arranged electrodes of a matrix-type liquid crystal display is discussed below. This exemplary embodiment of the invention will better explain operation of a liquid crystal display constructed in accordance with the invention.

BEST MODE FOR PRACTICING THE INVENTION

As an example application of the invention, a matrix display as is known in the art may be considered that has row electrodes patterned on the inside of one of the cell surfaces, and column electrodes pattered on the inside of the other cell surface.

As described, the preferred addressing cycle according to the invention includes four states where voltages are applied to columns and rows as follows. First, there is the preparation phase, where pixels in a particular row are addressed by the row electrode with a high voltage causing all of them to switch to the homeotropic state. Next, in the so called selection phase, the voltage applied to one selected row is of a value that, when combined with the data voltages applied to the columns of the display, result in voltages being applied to particular pixels in the selected row effective to switch the pixel to a state corresponding to the value of the voltage applied to the column electrodes. This state will either be transient planar or homeotropic. Third, in the so called evolution phase, those pixels in the transient planar texture after the selection phase evolve to the focal conic texture and those pixels in the homeotropic state after the selection phase remain in the homeotropic state. Finally, there is a hold or storage phase during which the voltage is reduced or taken to zero and the pixels in the focal conic state remain in that state, while the pixels in the homeotropic state relax to the reflecting twisted planar state.

Figure 1:
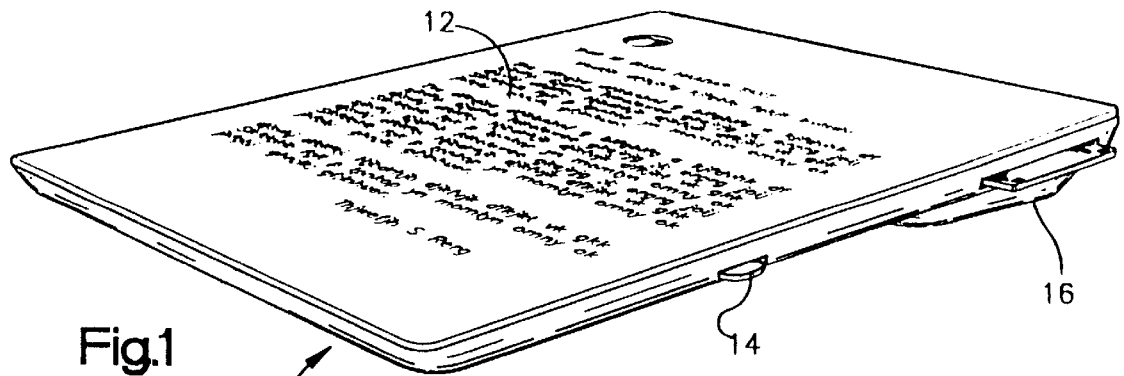
FIG. 1 is a perspective view showing a flat-panel liquid crystal display used for displaying images on a portable document viewer.

Turning now to the drawings, FIG. 1 shows a flat-panel liquid crystal display 10 for use with a document viewer 12 with which the aforementioned method may be employed. The particular viewer 12 shown in FIG. 1 is a portable electronic viewer for books, news or similar documents, which includes a page selection switch 14 that is integral with the unit and a memory card or floppy disk 16 which can carry the information to be viewed on the document viewer 12. Such a viewer 12 may conveniently include a hard disk drive, a floppy disk drive, and/or various other input/output devices.

The display 10 is most preferably capable of displaying images as well as text. For displaying images and text it is necessary to refresh or update the display 10 in about one second or less to limit user perception of the updating process. Resolution of the display 10 is quantified in terms of vertical and horizontal lines on the display screen. Present minimum resolution requirements for a page size document viewer is 1,000 lines, which must be capable of being addressed in less than about 1 second.

Although the invention is disclosed in the context of document viewer 12, the present invention has applicability to other displays for use with palm-held computers, pagers, computers for conveying specialized information, signs, electronic books and newspapers and the like as would be known to those of ordinary skill in the art in view of this disclosure. In addition, larger displays such as for highway signs and the like can incorporate the methods and apparatus of the invention.

The display 10 is constructed using a reflective bistable chiral nematic liquid crystal material whose display state can be controlled by application of a control voltage across the liquid crystal material. Suitable chiral nematic liquid crystal materials and cells, as well as their manner of preparation would be known to those of ordinary skill in the art in view of this disclosure. Preferred chiral nematic liquid crystal materials and cells are disclosed in, for example, U.S. Pat. Nos. 5,453,863 and 5,437,811, the disclosures of which are incorporated herein by reference. Depending upon the size and duration of the control voltage, a picture element (pixel) can be made to exhibit a light reflecting twisted planar texture, a homeotropic texture or a focal conic texture. Control over each picture element of the display is possible due to the ability of the chiral nematic liquid crystal material to be rapidly updated.

Figure 2A:
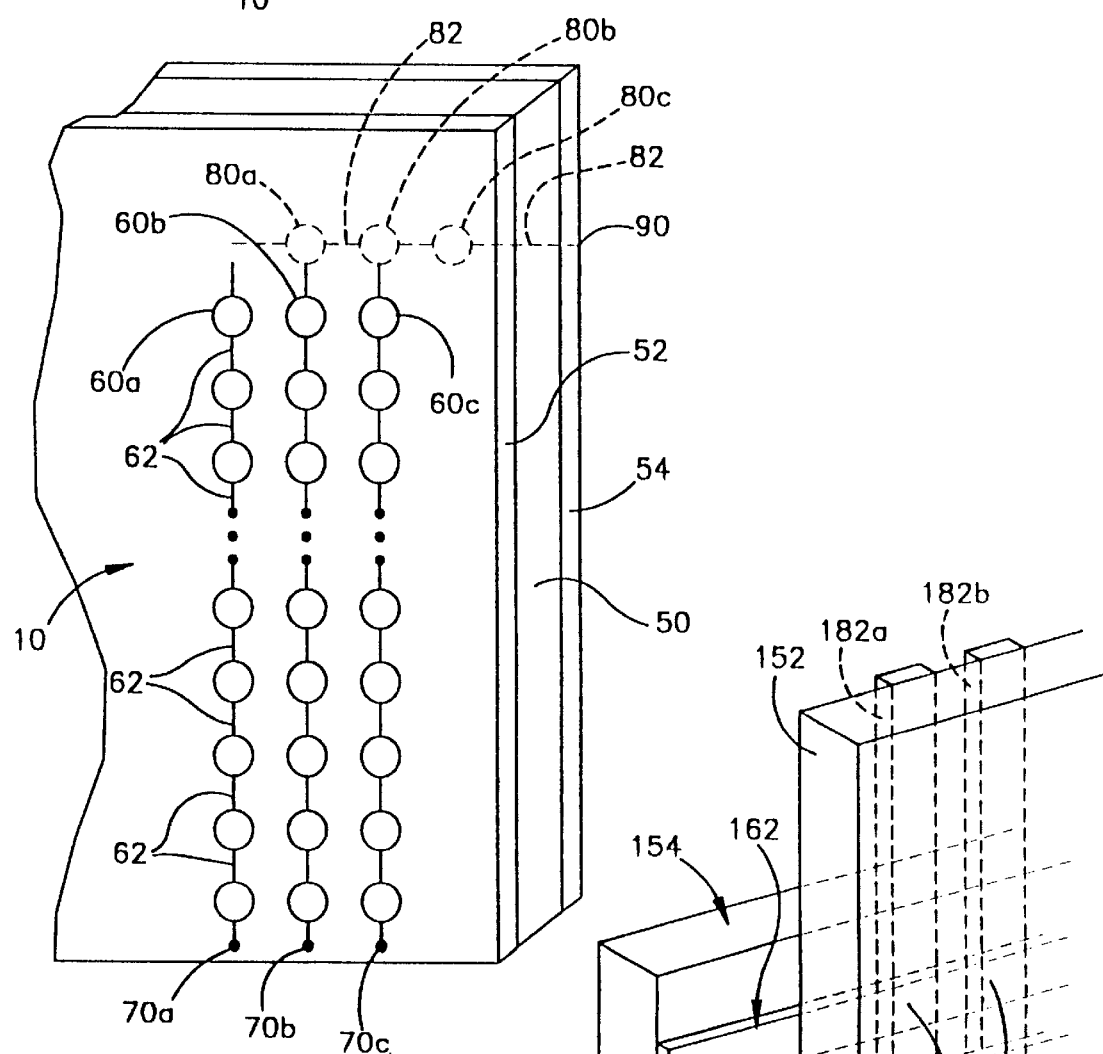
FIGS. 2A and 2B are schematics depicting configurations for energizing row and column picture elements of the flat-panel display.

The perspective schematic view of FIG. 2A shows a small segment of the display 10. A layer 50 (thickness of 5 microns) of chiral nematic liquid crystal material is sandwiched between two clear containment plates 52, 54 which do not interfere with the light reflecting or transmissive characteristics of the material 50.

Attached on either side of the plates 52, 54 are arrays of electrodes coupled to a circuit (FIG. 7) described below for energizing the electrodes. As seen in FIG. 2A, the plate 52 supports ordered arrays of interconnected electrodes. The electrodes on the plate 52 are interconnected to define columns of interconnected electrodes all maintained at the same electrical potential. As an example, the electrode 60a and all other electrodes that form a column of electrodes are coupled to electrical leads 62 energized at an input 70a along a bottom edge of the display 10. Similarly, the electrode 60b is maintained at the same electrical potential as other interconnected electrodes in its column by the input 70b. Finally, a third representative electrode 60c is interconnected with other electrodes along the column energized by the input 70c.

As described more fully below, a display state of a picture element directly beneath the electrode 60a is controlled by a voltage difference between the electrode 60a and the voltage on an electrode 80a on the other side of the liquid crystal layer 50 that is supported by the plate 54. Three electrodes 80a, 80b, 80c are shown in phantom positioned on an opposite side of the display 10. These electrodes 80a, 80b, 80c are electrically interconnected by electrical leads 82 coupled to an input 90 at the edge of the containment plate 54.

Selective control of the voltage applied to the electrodes 60a, 80a determine the electric potential applied across the liquid crystal material defining the picture element or pixel beneath the electrodes 60a, 80a. By control of the voltage applied to the inputs 70a, 90, this potential can be adjusted and, more specifically, can be controlled in accordance with a method for choosing between a picture element in the focal conic texture and a picture element in the twisted planar texture. By selectively controlling the optical characteristics of each picture element that make up the display 10, the drive circuits 58 can present an image or display text on the display.

Such a display can be updated at rates of at least 500 scan lines per second. It is noted that the electrodes are conceptually represented by circles, e.g. 60a, in FIG. 2A, to facilitate the discussion of the various states of a display shown in FIGS. 4A–4F.

Figure 2B:
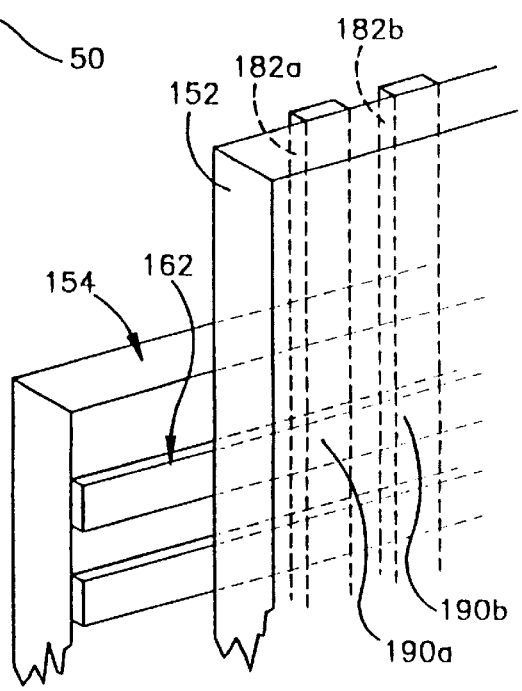

FIG. 2B is a second representation more accurately reflecting the structure of a passive matrix type display for application of the inventive method. As can be seen in FIG. 2B, plates 152 and 154 support transparent electrodes 162 and 182a, 182b coated as lines onto the substrates. The circles such as 60a in FIG. 2A represent pixels which, as shown at 190a and 190b in FIG. 2B, occur at the intersection of the conductive electrode 162 with conductive electrodes 182a and 182b, respectively.

THERR PHASE DUIVE SCHEME

Figure 3A:
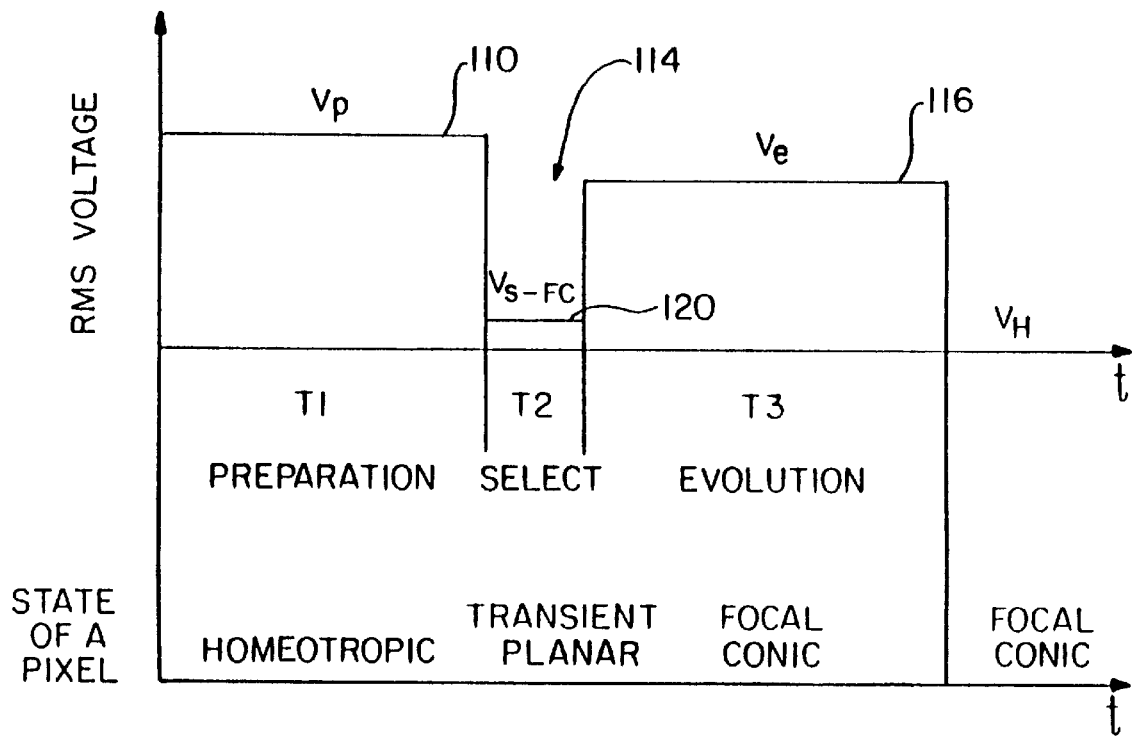
FIGS. 3A and 3B are voltage sequences that are coupled across liquid crystal material to achieve two different liquid crystal display states.
Figure 3B:
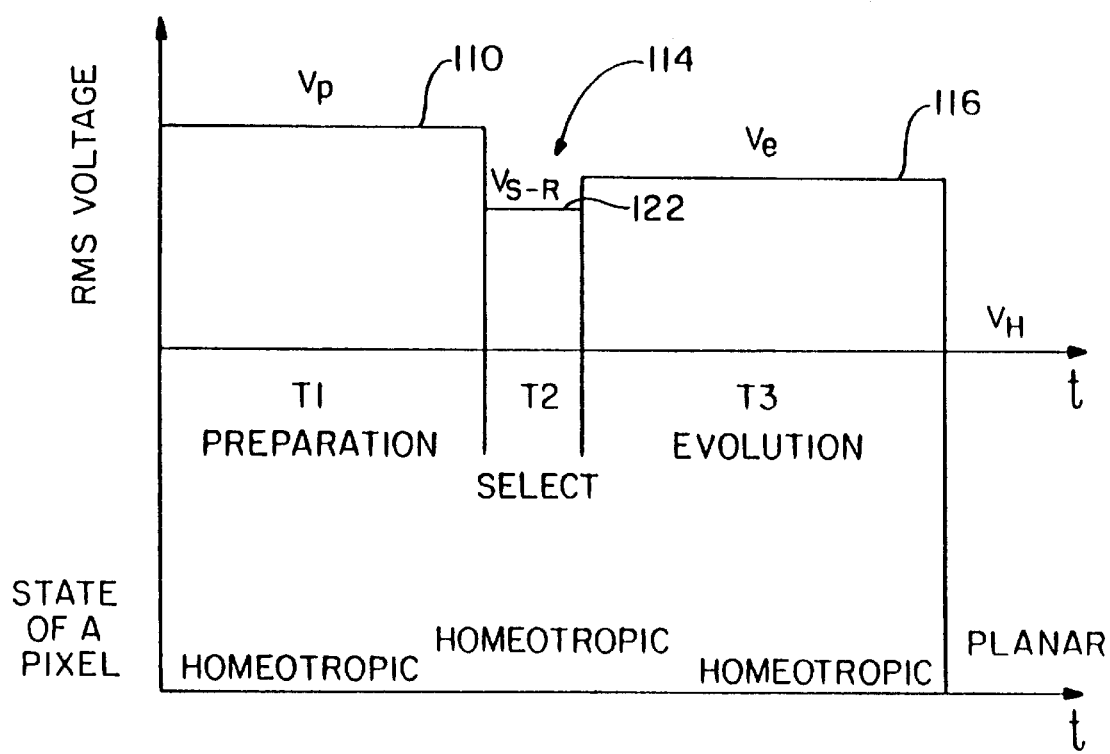

FIGS. 3A and 3B illustrate a manner in which the display state of a picture element is controlled. Chiral nematic liquid crystal material, as is known in the art, can be energized by application of a voltage to exhibit multiple optical states or textures. Three representative textures for the liquid crystal material are homeotropic, twisted planar, and focal conic. When in the homeotropic state, the liquid crystal material is transparent to incident light impinging upon the liquid crystal material. When in the focal conic state, the liquid crystal material weakly scatters the light, although if the path length is short enough the state can appear transparent, and will appear black when the back substrate is painted black. When in the twisted planar state, the liquid crystal material reflects the light. The final display state of picture elements of liquid crystal material that make up the display 10 is selected in accordance with the inventive method to be in either the focal conic or twisted planar state. The liquid crystal in the planar texture reflects light impinging upon the display, and the liquid crystal in the focal conic texture will appear transparent or weakly scattering to provide sufficient contrast with the planar texture. No back-lighting is required.

FIGS. 3A and 3B display root means square (rms) voltages as a function of time applied across a picture element (pixel) to achieve either the focal conic (3A) or the twisted planar (3B) state. As seen in FIGS. 3A and 3B each of the control voltages applied to the liquid crystal material starts with a preparation phase 110 of duration T1 , during which the liquid crystal material is forced into its homeotropic state. The voltage during the preparation phase $V_P$, and the duration of this phase T1 need to be sufficient to cause the complete transformation of the material to the homeotropic texture. Although there is no upper limit on the values that will drive the material to the homeotropic state, if they are too low then after the completion of the addressing cycle the device will not have as high a reflectivity in the reflecting state as is possible. However, in theory, once $V_P$ is high enough and T1 is long enough to drive the material completely into the homeotropic state, the preparation step is essentially satisfied and the final state of the pixel will not be dependent on the state of the pixel prior to the preparation phase. In practical application, the maximum value of $V_P$ is limited by the hardware. Moreover, an excessively long T1 conflicts with the objective of quickly updating the display. Thus, ideally the parameters for any given display should be optimized to employ a $V_P$ as low as possible to simplify the driver hardware and display design, and a T1 as short as possible to optimize driving speeds. Increasing the value of $V_P$ will in general shorten the value of T1.

In one embodiment the preparation stage may be modified to allow less image retention from the initial states of the liquid crystal prior to entering the preparation phase, which degrades the final reflectance from the device. Typically, the value of $V_P$ is higher and the duration of T1 will be longer to avoid this image retention effect. In the preparation phase, the high voltage may be turned on and off several times to place the liquid crystal material completely in the homeotropic state in a shorter time interval T1 . In other words, the duration of the preparation phase may be reduced.

After an appropriate time period T1 which, in a preferred embodiment in the invention is approximately 40 milliseconds, the method enters the so called selection phase, wherein the liquid crystal material is activated with a selection voltage $V_S$ for selecting between the focal conic and twisted planar final state. An important aspect of the invention is that this so-called selection phase 114 lasts only a short period T2 (about one or two milliseconds), much less than the preparation phase 110. In application of the addressing sequence of the invention, the selection voltage may be applied to one line at a time, progressing down the rows in pipe-line fashion.

Figure 3C:
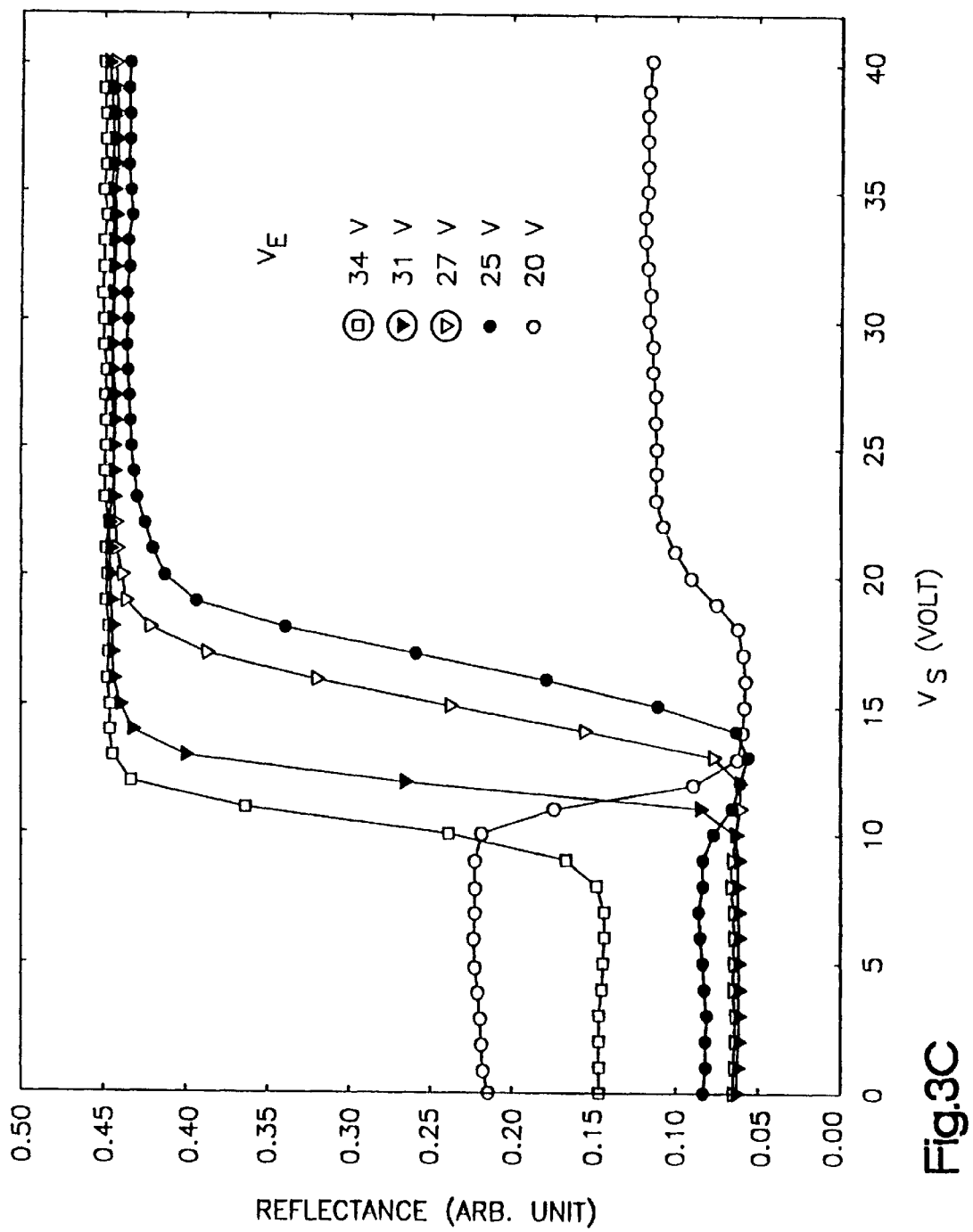
FIG. 3C is a plot showing the effect of varying evolution phase voltages on a final state of a liquid crystal material with respect to varying selection phase voltages.
Figure 14:
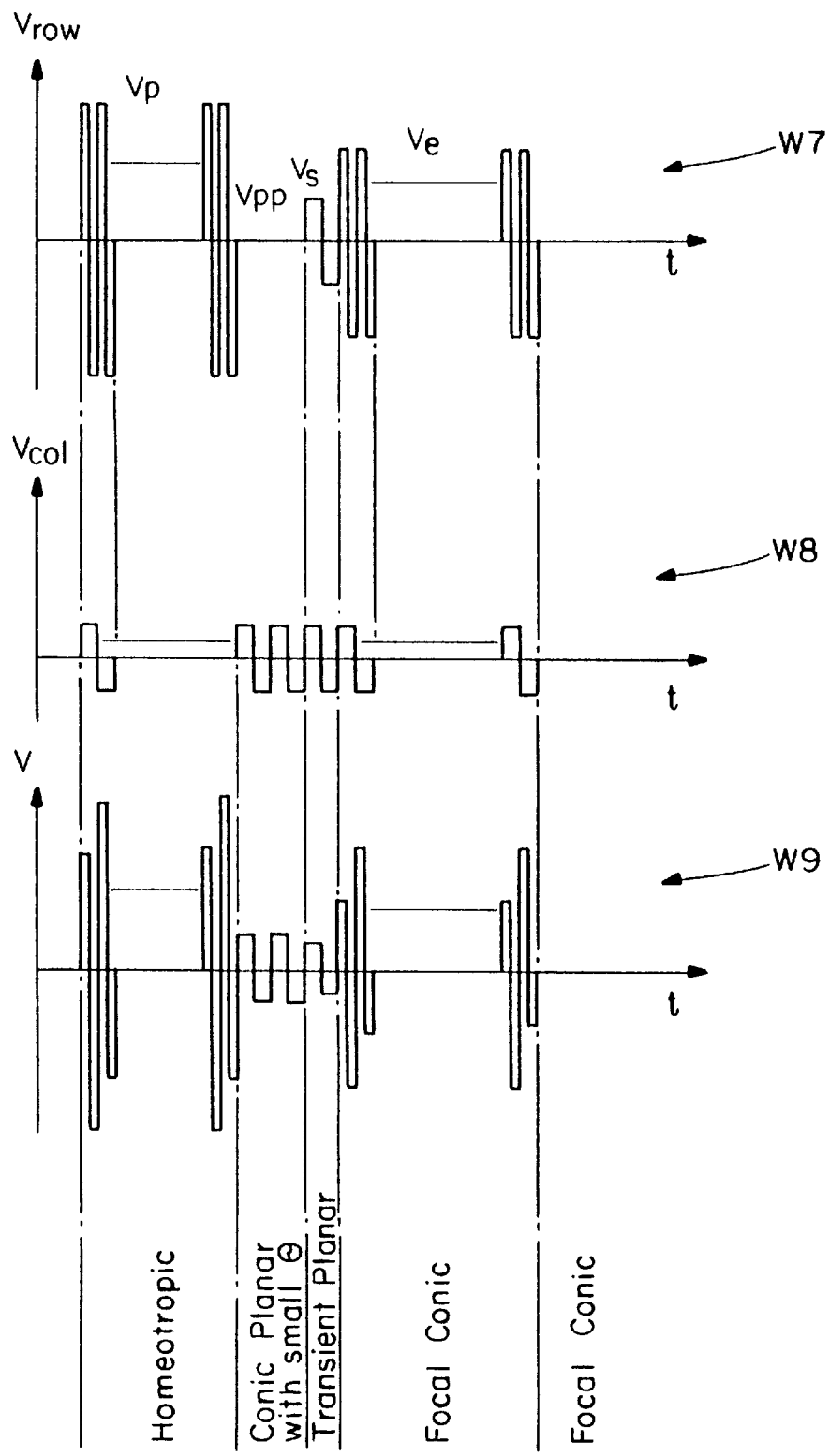
FIGS. 14 and 15 are waveforms used in activating the liquid crystal picture elements.

Without wanting to be bound by theory, it is also contemplated that several lines may be selected simultaneously, with the plurality of selected rows being moved down the display in pipe-line fashion. The ability to select more than one line at a time is in theory made possible due to the steepness of the select pulse vs. final intensity curve as shown, for example, in FIG. 3C for the case of $V_E$ equal to 31 volts. As can be seen in FIG. 3C, 14 volts would be a sufficient selection voltage to drive the pixel to the reflective state, and 11 volts would be sufficiently low to drive the pixel to the focal conic state. By applying the well known Alt and Pleshko waveforms to the lines being selected, the number of lines that can be simultaneously selected is dependent on the ratio of the selection voltage necessary to drive the pixel to the reflective state ($V_{S-R}$), and the selection voltage necessary to drive the pixel to the focal conic state ($V_{S-FC}$) according to the relation: # lines=$[((V_{S-R}/V_{S-FC})^2+1)/((V_{S-R}/V_{S-FC})^2-1)]^2$. For the values of $V_{S-R}$ equal to 14 volts and $V_{S-FC}$ equal to 11 volts, this would indicate that about 18 lines could be selected at one time for the material and cell used to produce FIG. 3C. By applying voltage values between $V_{S-R}$ and $V_{S-FC}$, the liquid crystal material exhibits gray scale properties.

During an evolution phase 116, the liquid crystal material is energized for a period T3 at an evolution voltage $V_E$ less than the preparation voltage, but greater than the selection voltage. In the evolution phase 116, the liquid crystal material is either maintained in a homeotropic configuration or evolves into a focal conic state. When the evolution voltage $V_E$ of FIGS. 3A and 3B is removed, the liquid crystal material enters a focal conic (FIG. 3A) or twisted planar (FIG. 3B) final state depending upon the voltage chosen during the selection phase 114. As seen by comparing the FIG. 3A and 3B waveforms, the only difference in voltage occurs during the selection phase 114, during which $V_S$ either has a relatively low voltage $V_{S-FC}$ 120 (FIG. 3A) or a higher voltage $V_{S-R}$ 122 which determines the final state of the picture element to be focal conic or light reflecting twisted planar, respectively.

While the selection voltage determines the final state of a pixel, it is noted that the evolution voltage can effect the appearance of the pixel. FIG. 3C shows the effect of the choice of $V_E$ on a graph of selection voltage versus final device reflectance. It can be seen that for $V_E$ greater than 34 volts a selection voltage $V_S$ of less than 11 volts does not result in a state of lower reflection, and that for $V_E$ less than 25 volts the same problem occurs, and the reflection resulting from $V_S$ greater than 14 volts is reduced from its maximum value. Thus, with this device it has been found that for proper operation of the addressing scheme according to this preferred embodiment, $V_E$ must be between 25 and 34 volts, with 31 being a preferred value.

It is also notable that by increasing T3 , the duration of the evolution phase, one can improve the contrast ratios between the twisted planar and focal conic states. However, this also has the effect of slowing the drive speeds. Conversely, while increasing the value of $V_E$ is conducive to faster speeds, it reduces the contrast ratio. Of course, the specific optimum voltages will vary depending upon specific materials used and construction of the cell, but it would be within the ordinary skill in the art to optimize such parameters in view of the instant disclosure.

Figure 5:
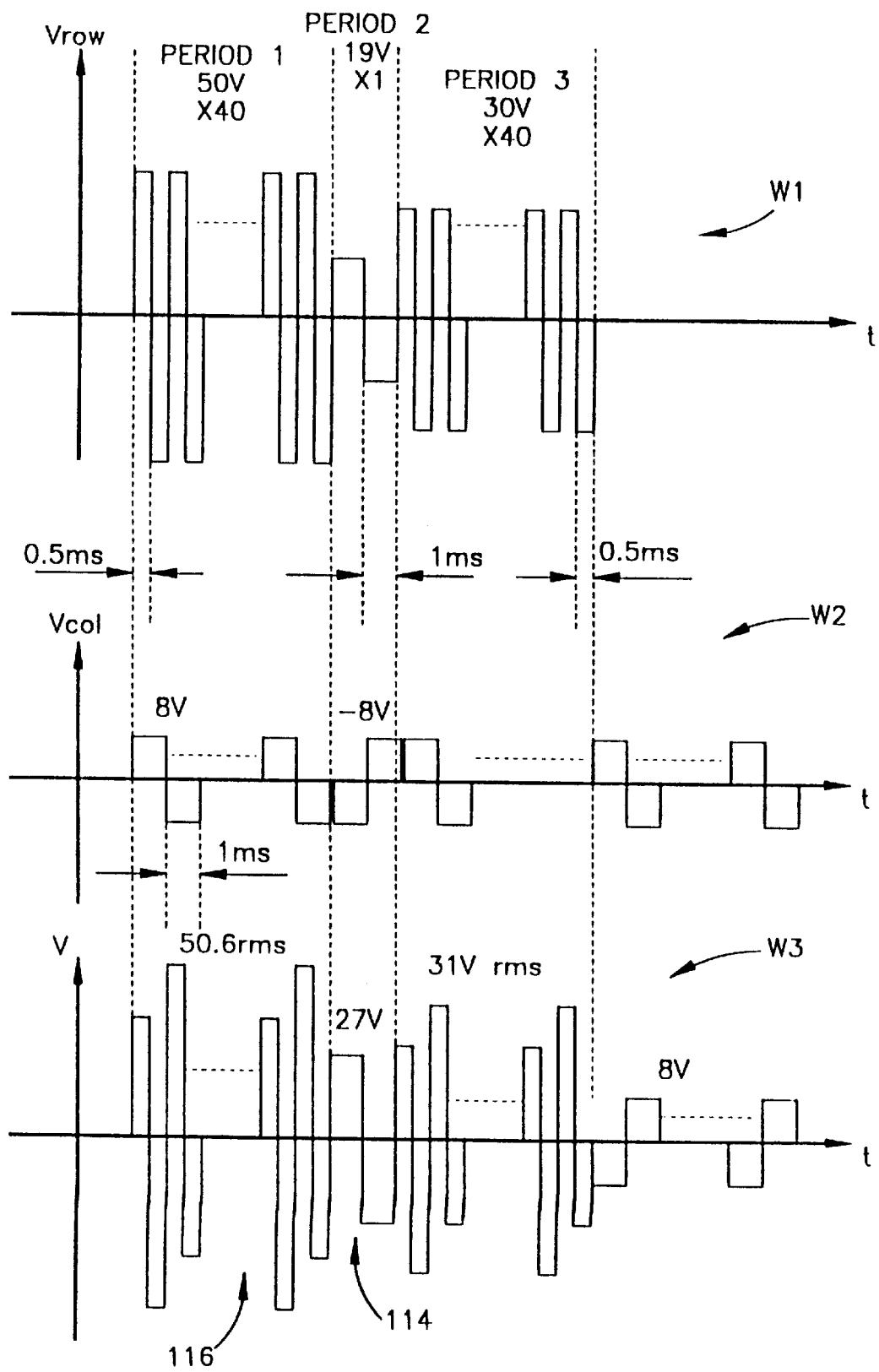
FIGS. 5 and 6 are a series of waveforms used in activating the liquid crystal picture elements.
Figure 6:
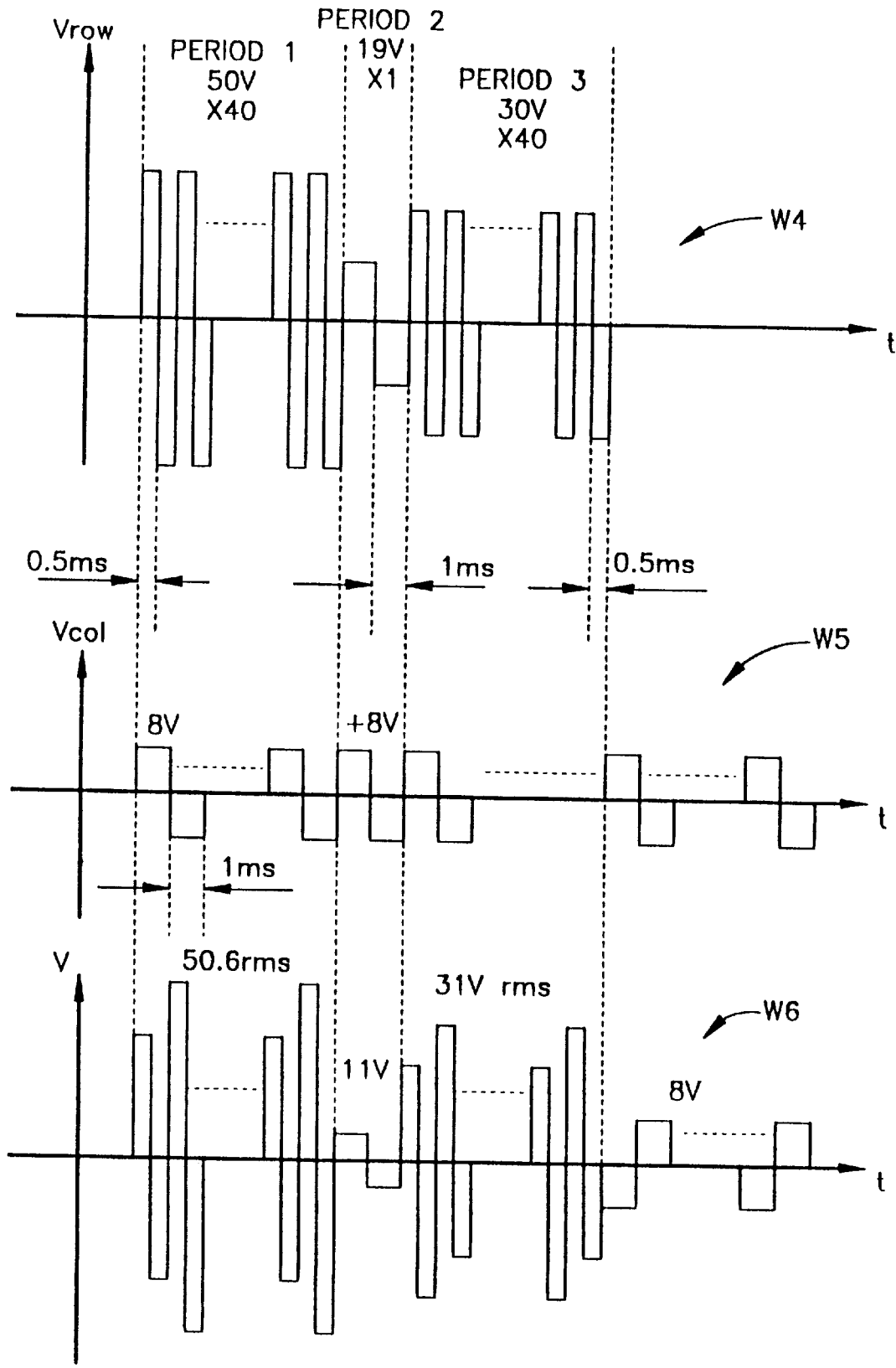

The waveforms depicted in FIGS. 3A and 3B are root means square voltage representations. The actual waveforms are shown in FIGS. 5 and 6. The waveforms are bipolar signals which oscillate above and below ground voltage to avoid ionic conduction to the liquid crystal material sandwiched between the two plates 52, 54. The RMS voltages across the liquid crystal material are about 50 volts during the preparation phase 110, 31 volts during the evolution phase 116, and a choice of either 11 volts or 27 volts during the selection phase 114 depending upon the desired final state.

As shown in FIG. 5 and FIG. 6, the column voltage is applied to the display through the whole addressing time period until the end of the evolution stage of the very last row. In order to obtain twisted planar states with high reflectivity, the column voltage $V_{col}$ must be lower than a certain value. If the column voltage is too high, the transition from the homeotropic state to the twisted planar state can not occur and/or the pixels that are already written to the twisted planar state may be switched to the focal conic state. Another limitation on the column voltage is that $2V_{col}$ must be large enough to obtain the desired final states. As can be seen in FIG. 3C, for the $V_E$=31 volts curve, the $2V_{col}$ needs to be greater than about 5 volts.

It has been observed that if the voltage in the preparation and evolution phases have the same frequency as the column voltage, then the effect of data voltages on the pixels in the preparation and evolution phases can cause improper operation of the device known as "crosstalking." Due to the sensitivity of the operation of the device to the value of the voltage applied during the evolution phase, the effect can be particularly large. However, it has been found that if the frequency of the voltage applied to the rows of pixels in the preparation and evolution phases is of a different frequency than that applied to the columns, the crosstalking effect is reduced. In order to further prevent the crosstalking effect, the frequency of the row voltage in the select phase ($f_S$) is the same as the frequency of the column voltage ($f_{col}$), and in the preparation and evolution phases, the frequency $f_P$ and $f_E$ are different from $f_{col}$ and preferably have the values according to the following relations:

$f_S = f_{col}$ $f_P = nf_{col}$ or $f_P = (1/n)f_{col}$ $f_E = mf_{col}$ or $f_E = (1/m)f_{col}$ wherein n and m are integers greater than 1. In the example depicted in FIGS. 5 and 6, $f_S = f_{col} = 500$ Hz, and $f_P = f_E = 2f_{col} = 1000$ Hz.

Figure 4A:
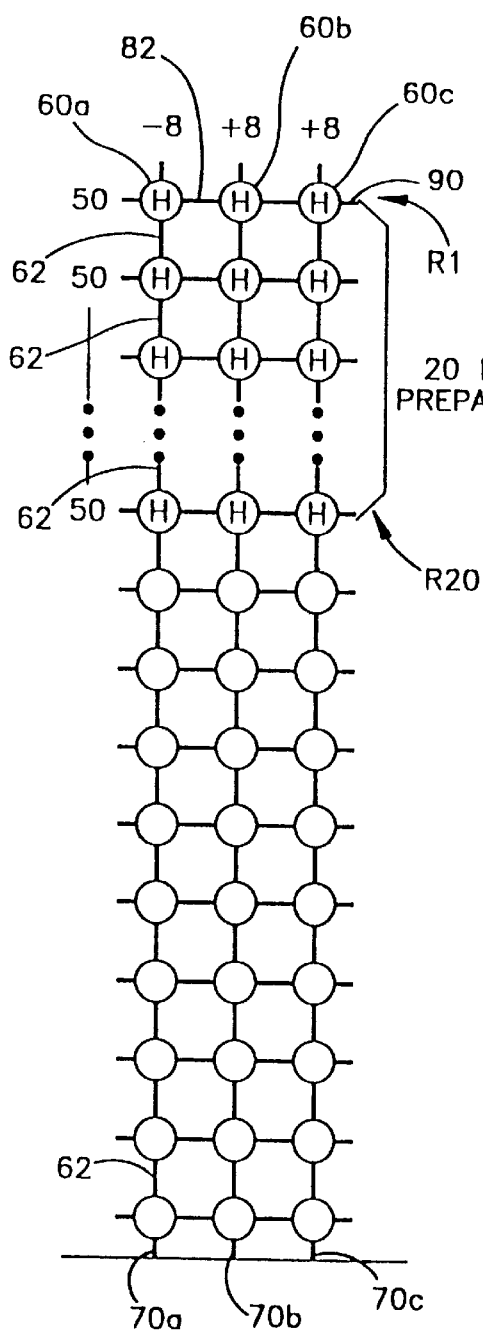
FIGS. 4A–4F are schematics showing arrays of electrodes for controlling the display states of liquid crystal material sandwiched between the electrodes.
Figure 7:
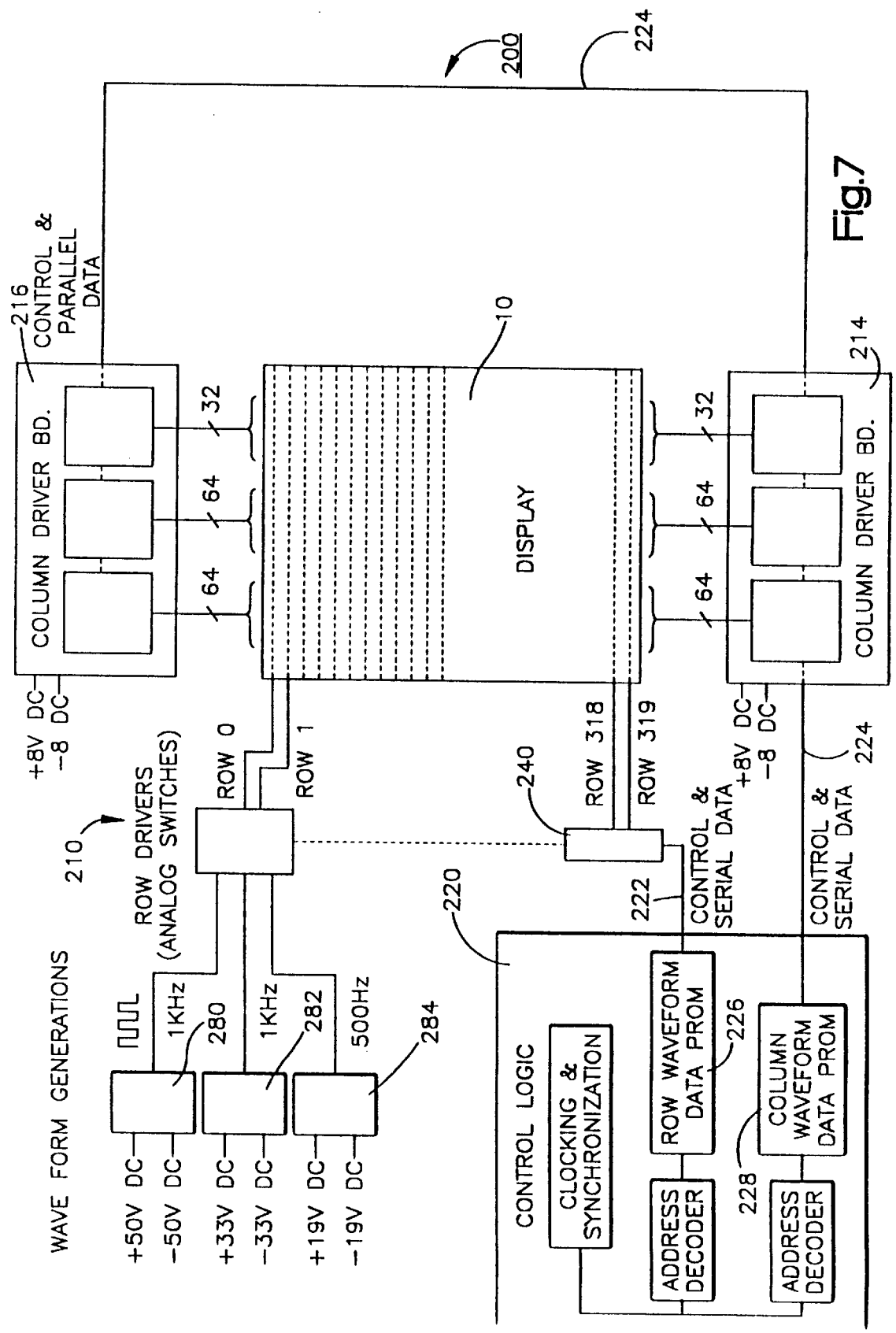
FIG. 7 is a block diagram of display driver circuitry for providing drive signals to activate a liquid crystal display.

FIGS. 4A–4F illustrate a manner in which these voltages are applied by the FIG. 7 drive circuit at edge inputs to the electrodes shown in FIG. 2. Turning to FIG. 4A, this figure depicts a plan view of the electrodes with the intervening structure of the containment plates 52, 54 and liquid crystal material removed for ease in depiction. The electrode 60a in the upper left-hand corner of FIG. 4A overlies the electrode 80a and, in a similar manner, the two electrodes 60b, 60c overlie the electrodes 80b, 80c.

Each of 20 rows R1–R20 simultaneously receives a 50 volt RMS signal during the preparation phase 110. A first row R1 bounded by three representative column electrodes 60a, 60b, 60c is about to complete its preparation phase 110 and a row R20 is just beginning its preparation phase. Voltages applied to the column electrodes of –8 volts, +8 volts, and the +8 volts at edge inputs 70a, 70b, 70c are not large enough to disrupt preparation picture elements that make up these 20 rows so that all the pixels of these rows are being converted to the homeotropic state.

Figure 4B:
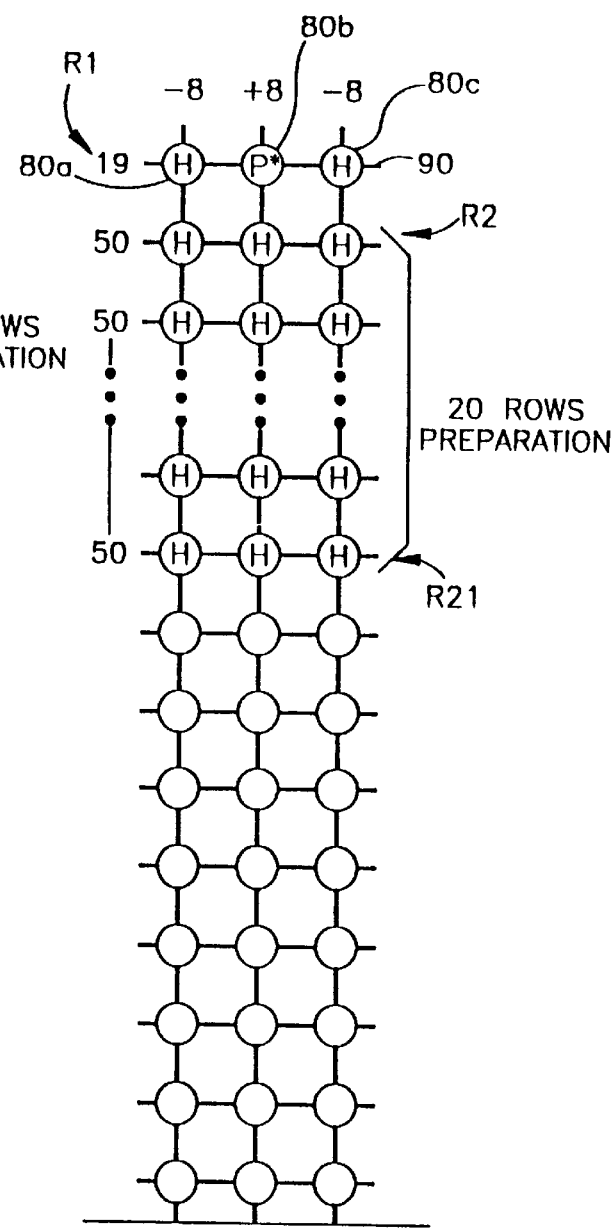

Turning to FIG. 4B, the drive circuits shift the 50-volt RMS signal one row downward as seen in FIG. 4B so that 19 of the 20 rows depicted in FIG. 4A remain in the preparation phase 110. The row R1 of electrodes that includes pairs of electrodes 60a, 80a, 60b, 80b, 80a, 80c on opposite sides of the layer is now energized with bi-polar voltages appropriate for the selection phase 114. A 19-volt RMS signal is applied to the edge input 90. Drive circuits coupled to the edge inputs 70a, 70b, 70c continue to apply 8-volt RMS signals of controlled polarity to select the state of the pixel element bound by the electrodes in this row R1.

The picture element bounded by the electrodes 60a, 80a has just entered the selection phase. Application of a voltage of –8 volts maintains this picture element in the homeotropic state. As seen in FIG. 3B, this will produce a twisted planar configuration for the final state. The picture element bounded by the electrodes 60b, 80b is energized to cause the pixel between these electrodes to switch to the transient twisted planar state. As seen in FIG. 3A, this will result in a focal conic configuration for the picture element in the final state.

The picture elements bounded by the electrodes depicted in FIGS. 4A and 4B are labeled with the designation "H" for homeotropic, "P" for twisted planar or "P*" for transient planar to indicate the instantaneous state of the liquid crystal beneath the electrodes. Thus, the picture element bounded by the two electrodes 60b, 80b has been designated with a "P*" designation in FIG. 4B.

Waveforms for choosing between either the focal conic or twisted planar end states are shown in FIGS. 5 and 6. As seen in these figures, square wave RMS signals are applied by the drive circuits to couple an appropriate voltage across a picture element during the selection phase time period T2. Three different waveforms are depicted. One waveform W1 indicates the row input signals along the input 90, for example. A second waveform W2 indicates a column input such as a signal at one of the inputs 70a, 70b, 70c. A third waveform W3 indicates the net or resultant signal across the picture element.

The waveforms in FIG. 5 maintain the liquid crystal in a homeotropic state during the selection phase. As discussed above, this results in a twisted planar final state for the liquid crystal. FIG. 6 shows voltage-activation waveforms W4, W5, W6 that allow the liquid crystal material to change from the homeotropic state during the preparation phase 110 to a transient twisted planar state during the selection phase 114. This causes the liquid crystal to switch to a focal conic state after the evolution phase.

Figures 4C, 4D:
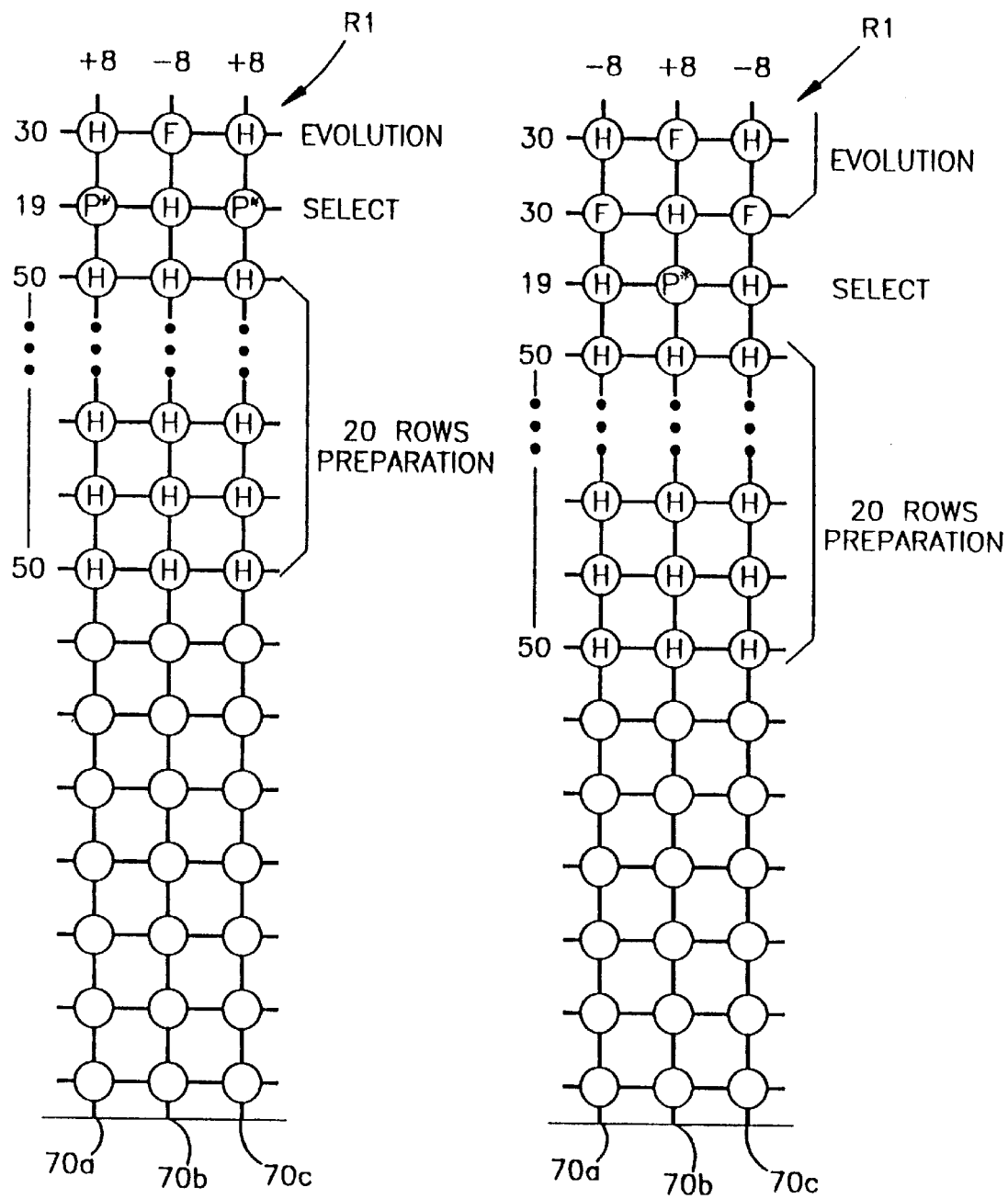

FIGS. 4C–4F show continued application of control voltages to the electrode array bounding the liquid crystal layer 50. In FIG. 4C, the electrodes in row R1 bound liquid crystal material entering the evolution phase (see FIGS. 3A, 3B). Recall that in the FIG. 4B depiction, the electrodes 60b, 80b bounded a picture element where the control voltage at the input 70b allowed a transition to the twisted planar state. During the evolution phase, this picture element enters the focal conic state and ultimately will achieve a focal conic configuration, designated by an "F," after the evolution stage has ended. The picture element bounded by the electrodes 60a, 80a remain in the homeotropic state since, during the selection phase of FIG. 4B for row R1, a column control voltage was applied to maintain that picture element in the homeotropic state.

Figure 4E:
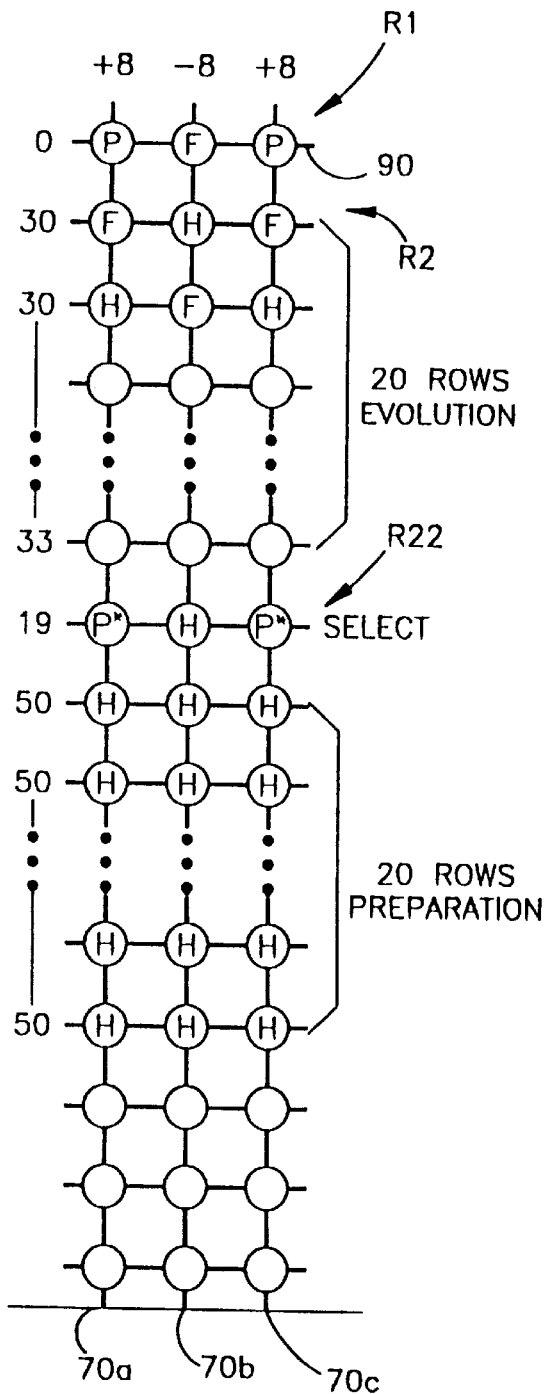
Figure 4F:
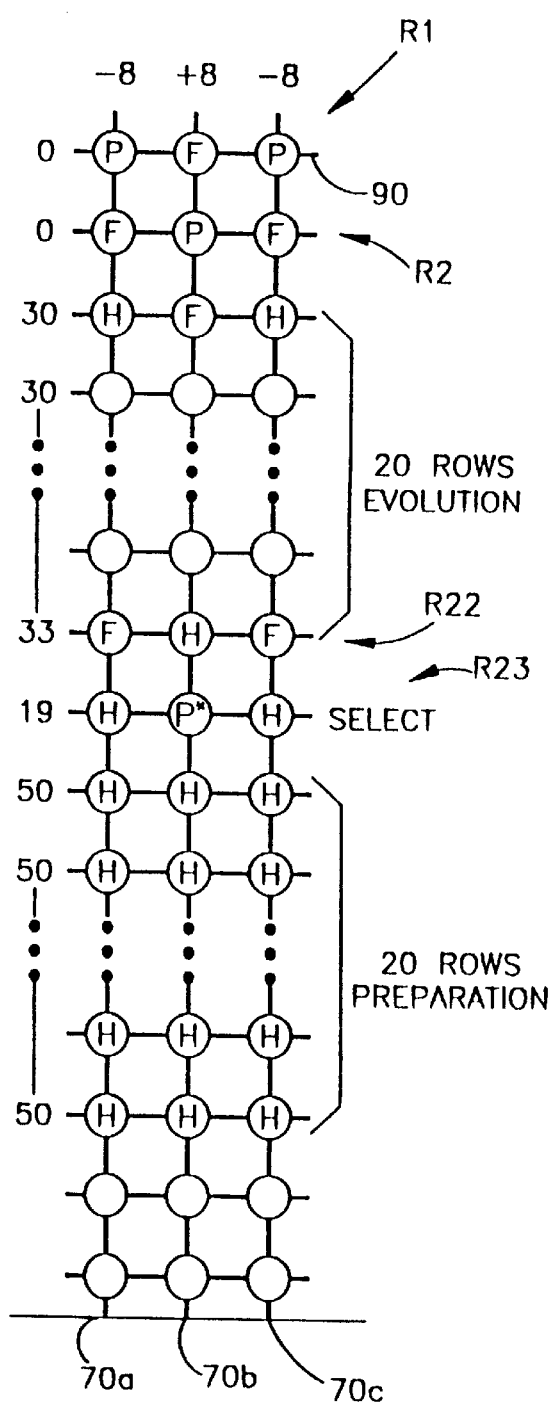

FIG. 4E depicts the row R1 after pixels of that row have experienced the evolution phase. The control voltage at the input 90 is reduced to 0 volts. The column inputs 70a, 70b, 70c are still selectively switched to activate a row R22 having just completed the preparation phase. This row R22 is spaced from the first row R1 by 20 other rows. FIG. 4F shows a situation wherein two rows R1, R2 have reached the end state as indicated by application of 0 volts along the row inputs to these two rows R1, R2. The column inputs 70a, 70b, 70c continue to vary depending upon the desired pixel states of a row R23 just beneath the row R22.

In a variation of the preferred embodiment, the preparation stage may be modified to allow less image retention from the initial states of the liquid crystal prior to entering the preparation phase, which degrades the final reflectance from the device. In this further embodiment, the preparation stage can include a pre-aligning sequence—turning the high voltage on and off a few times—adapted to more completely align the liquid crystal into the homeotropic texture prior to the selection phase. By more completely switching the material into the homeotropic texture during the preparation phase in accordance with this embodiment, any effect on the appearance of the final optical state of a pixel caused by differences in the initial states prior to the preparation phase is essentially eliminated. This also improves the contrast ratio.

In another preferred embodiment of the invention, the evolution voltage $V_E$ is selected to be relatively low, for example 10 to 15 volts, to alter the final state or appearance of the cell. In this embodiment, the evolution stage may employ voltages to cause evolution of transient planar texture obtained by the selection voltage to reflective planar rather than focal conic. In this embodiment the final states that result from the selection phase will be different than those resulting when the evolution voltage is higher in value. An advantage of this embodiment is that the states that are present at the end of the evolution time interval are the final states, and no transitions occur at the conclusion of the evolution phase. Thus, this embodiment differs from the previous embodiment only in the voltage applied following the selection phase and hence, in the resulting liquid crystal states. At the conclusion of the selection phase a voltage is applied to the pixels that has a level that allows pixels in the transient planar state to evolve into the reflecting twisted planar state, and pixels that are in the homeotropic state to evolve to the focal conic state. Therefore, the voltage level in this evolution phase must be chosen to be high enough so that the homeotropic state does not transform into the transient planar state, but low enough so that the transient planar state does not evolve into the focal conic texture and so that the homeotropic state transforms into the focal conic texture.

After the evolution phase of this additional embodiment, the voltage applied to the pixels can be reduced to zero, and because of the zero field bistability of these materials, the pixels that have evolved to the planar texture will remain in that state and pixels that have evolved to the focal conic texture will remain in that state at zero field. Thus, the method according to this embodiment employs the same preparation and selection phases as described previously. However, in the hold phase, the voltage can be lowered to a lower value or removed entirely and the pixels will remain in the planar or focal conic states obtained during the evolution phase.

FOUR PHASE DRIVE SCHEME

In an alternative embodiment of the present invention, it has been found that by adding an additional phase to the addressing sequence that additional time can be saved. In this drive scheme, shown in FIGS. 11A and 11B, the addressing sequence consists of four phases: preparation, post-preparation, selection and evolution. In the prior embodiment, shown in FIGS. 3A and 3B, the time interval for the selection phase was about 1 millisecond. In the present embodiment, the time interval for the selection phase and the added post-preparation phase is about 0.5 milliseconds.

Figure 11A:
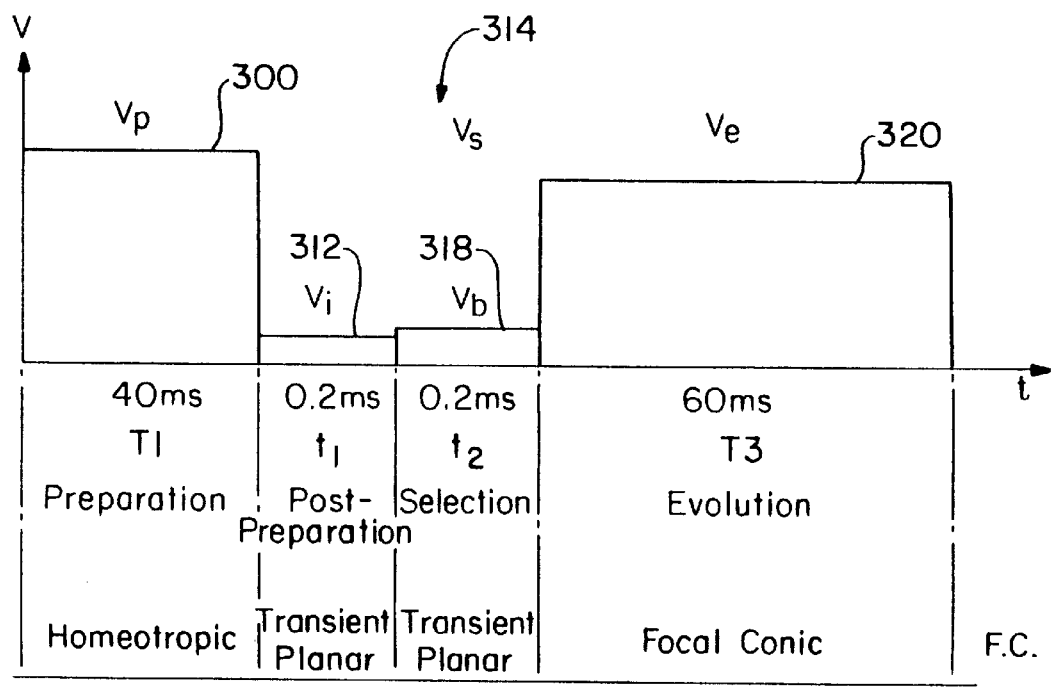
FIGS. 11A and 11B are voltage sequences that are coupled across liquid crystal material to achieve two different liquid crystal display states.
Figure 11B:
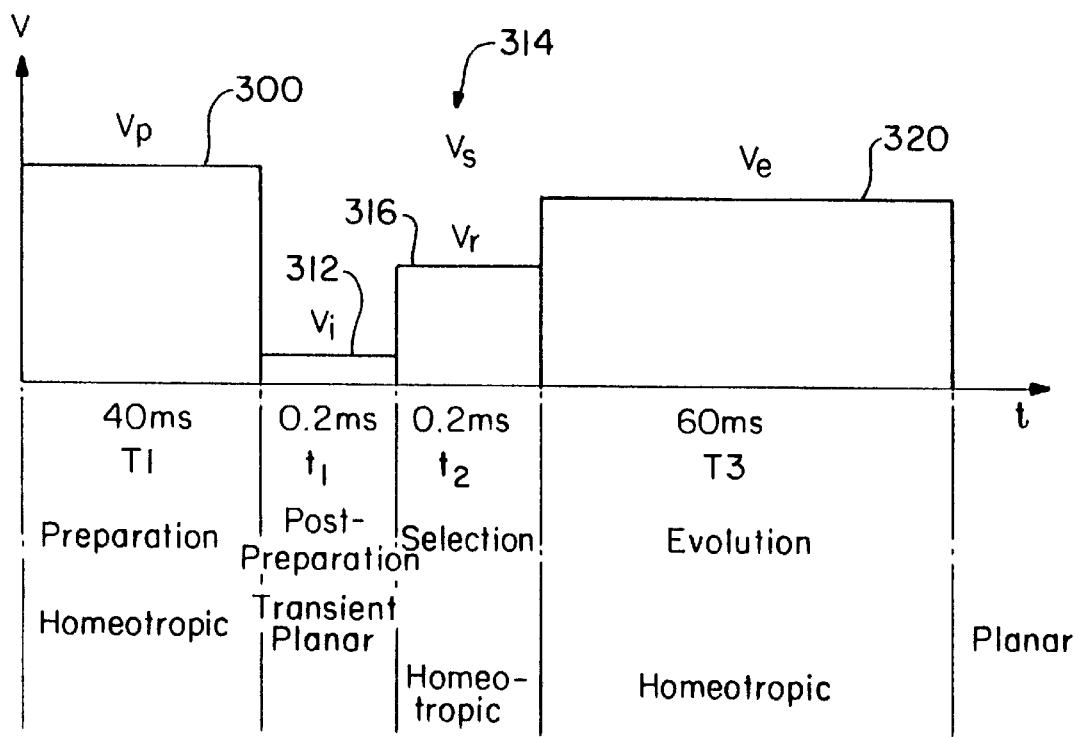

FIGS. 11A and 11B present the display states of a picture element in a manner similar to that of FIGS. 3A and 3B. FIGS. 11A and 11B display root means square (rms) voltages as a function of time across a pixel to achieve either a focal conic (11A) or a twisted planar state (11B). To obtain either state, a control voltage is applied to the liquid crystal material during a preparation phase 300 of duration T1 which forces the liquid crystal material into the homeotropic state. As before, voltage $V_P$ and the duration T1 must be sufficient to cause the complete transformation of the material to the homeotropic texture. Of course, the values selected for voltage $V_P$ and duration T1 are selected based upon the design considerations discussed in the previous embodiment.

In a post-preparation period 312, a voltage $V_i$, which is a much lower voltage value than the preparation voltage $V_P$, is applied to the liquid crystal material to initiate the transition from the homeotropic texture. To better understand this transition reference is made to FIG. 12. In the transition from the homeotropic state to the transient planar state, the polar angle $\Theta$ of the liquid crystal material changes from 0° to 90°. For cholesteric liquid crystal material reflecting visible light, the transition time is about 0.5 ms. As evidenced in FIG. 12, this transition $\Theta$ changes relatively slowly at the beginning of the transition. This slow interval is defined as $t_1$. The transition $\Theta$ then changes very quickly and this faster interval is defined as $t_2$. In this embodiment, for a cholesteric material reflecting green light, $t_1+t_2$ is equal to about 0.5 ms, where $t_1$ is the post-preparation phase 312 with a duration of about 0.2 ms and $t_2$ is the selection phase. In the previous embodiment (FIG. 3), the selection period (T2) covers the interval $t_1+t_2$. In the post-preparation phase 312, the applied voltage $V_i$ is relatively low and the material is allowed to relax through a conic helical structure to the transient planar state. During time interval $t_1$, the polar angle e only slightly deviates from 0°.

Figure 12:
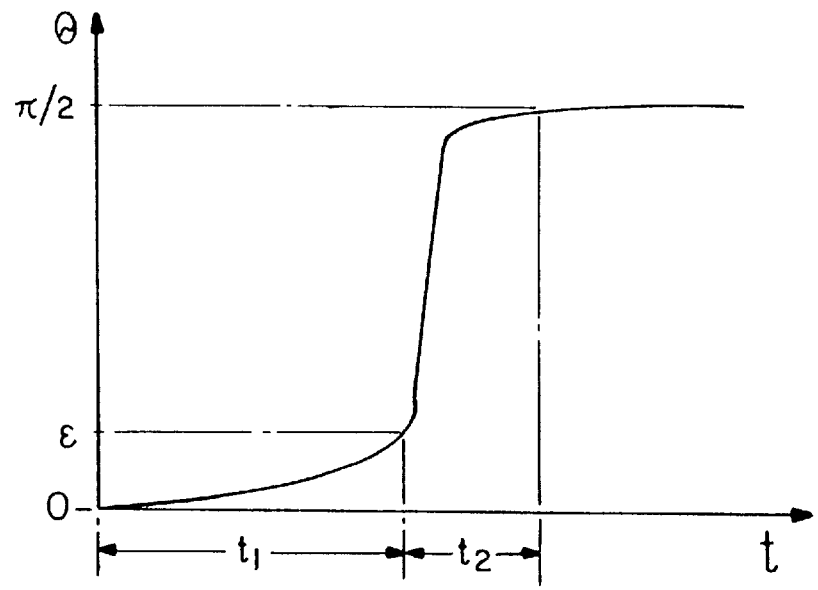
FIG. 12 is a plot showing the polar angle as a function of time for the liquid crystal material during the post-preparation period.

In a selection phase 314, a voltage $V_s$ is applied to the liquid crystal material for selecting between the focal conic and twisted planar final state. Voltage $V_s$ may be a high voltage $V_r$ 316 which stops the growth of the polar angle $\Theta$ and switches the material back into the homeotropic state. The value for voltage $V_r$ is much greater than the value for $V_i$. Alternatively, the voltage $V_s$ may be a low voltage $V_b$ 318 which lets the polar angle $\Theta$ continue to grow to 90° which causes the material to relax further to the transient planar state. The value for voltage $V_b$ is only slightly greater than the value for $V_i$. As seen in FIG. 12, the time interval $t_2$ for the polar angle $\Theta$ to change from $\epsilon \sim 5°$ to 90° is about 0.2 ms for a cholesteric liquid crystal material reflecting visible light. The voltage to switch the material back to the homeotropic texture depends on the polar angle of the material. A cholesteric material with a large polar angle requires a high voltage to force the material to the homeotropic texture.

In an evolution phase 320, a voltage $V_e$ is applied to the liquid crystal material to force the material into either the focal conic texture if the material is selected to the transient planar texture in the selection phase or is kept in the homeotropic texture if the material is selected to be in the homeotropic texture in the selection phase. The value for voltage $V_e$ is less than the preparation voltage, but greater than the post-preparation voltage. As in the previous embodiment, various factors such as contrast ratio and drive speed need to be considered when selecting a value for the selection voltage $V_e$ and the duration time T3.

After the evolution phase, the applied voltage is smaller than $V'_{pf}$ which is the voltage for the planar-focal conic transition. If the liquid crystal material is in the homeotropic texture then it relaxes into the reflecting planar state. If the material is switched into the focal conic state, then the material remains in the substantially transparent focal conic state.

Figure 13:
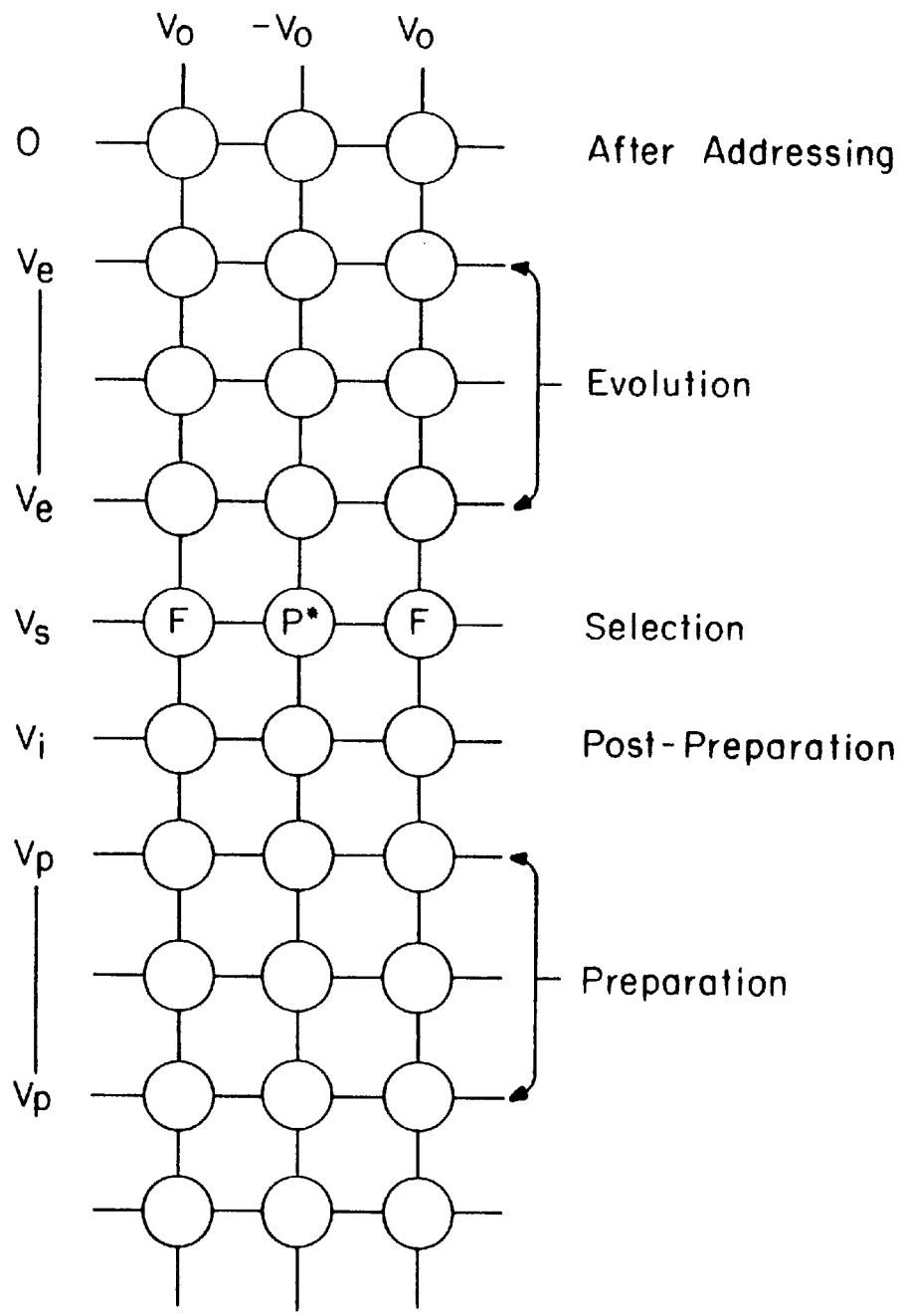
FIG. 13 is a schematic showing arrays of electrodes for controlling the display states of liquid crystal material sandwiched between the electrodes.

FIG. 13 presents a sequence in which voltages are applied to the electrodes shown in FIG. 2. In much the same manner as shown in FIGS. 4A–4F, FIG. 13 presents the addressing method applied to the respective row and column electrodes. Voltages $V_o$ and $-V_o$ are applied to the column electrodes while the preparation, post-preparation, selection and evolution voltages are sequentially applied to the row electrodes. The pixels bounded by electrodes depicted in FIG. 13 are labeled with the designation "F" or "P*" to indicate the states of the liquid crystal material between the electrodes during addressing. Those skilled in the art will appreciate that "F" designates that the pixel will eventually appear black when the liquid crystal material is in the focal conic state and that "P*" designates that the pixel will eventually appear reflective when the material is in the planar state. It will be appreciated that when $V_b=V_s-V_o<V_{p*h}$, the subject pixel will exhibit a transient planar state which ultimately results in a pixel with a focal conic texture. When $V_r=V_s-(-V_o)>V_{p*h}$, the subject pixel will exhibit a homeotropic texture which ultimately results in a pixel with a planar texture. The voltage value $V_{p*h}$ represents the voltage value required to force the liquid crystal material into the homeotropic texture.

Figure 15:
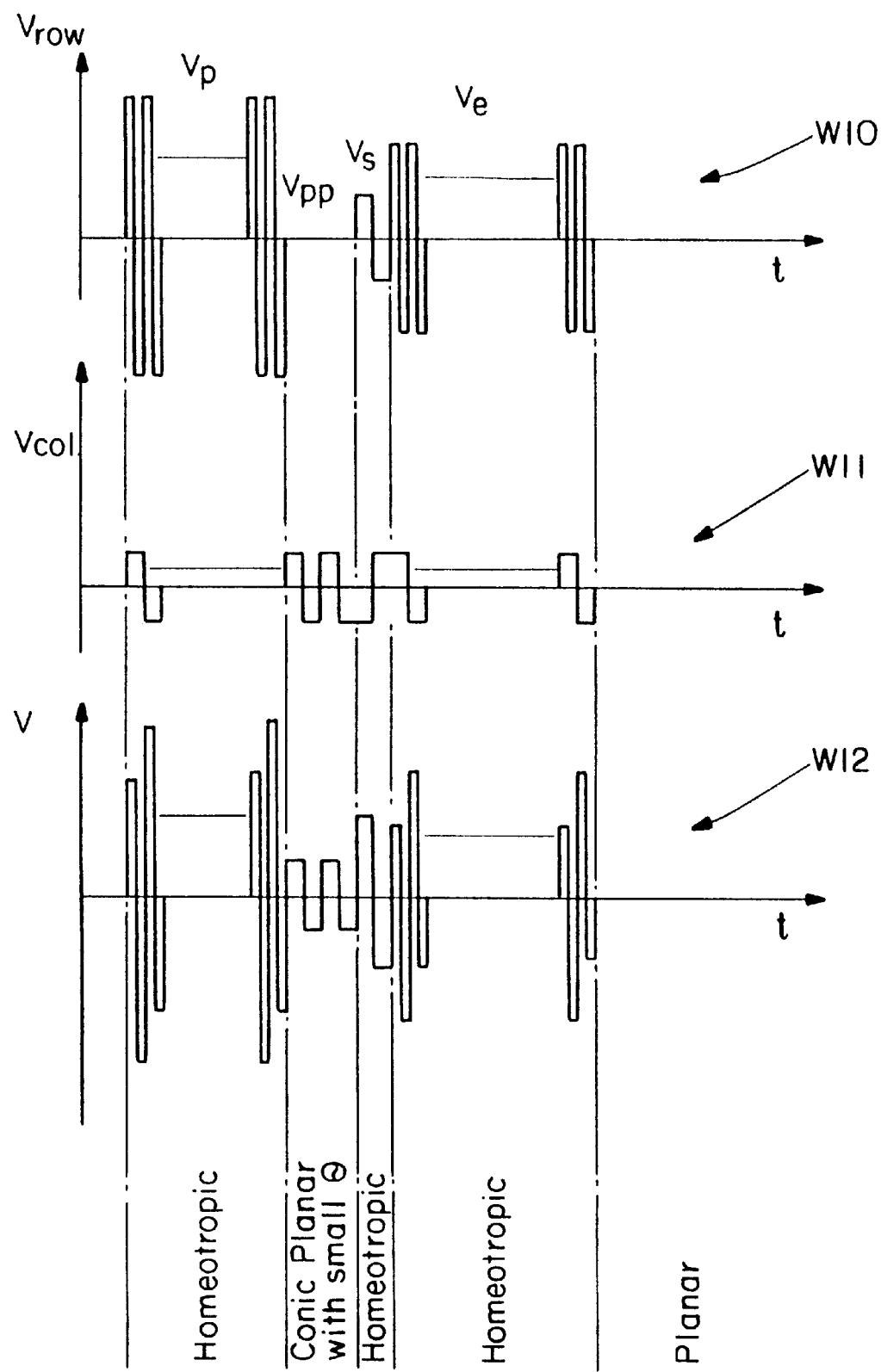

The actual waveforms applied to the electrodes are shown in FIGS. 14 and 15. These waveforms are bipolar signals which oscillate to avoid ionic conduction of the liquid crystal material. Waveform W7 shows the row input voltage, waveform W8 shows the column input voltage and waveform W9 shows the resultant or combined signal of W7 and W8 across the picture element. The waveforms shown in FIG. 14 allow the liquid crystal material to change from the homeotropic state during the preparation phase 300 to a transient planar state during the selection phase 314. This causes the liquid crystal material to switch to a focal conic state after the evolution phase 320. In FIG. 15 waveform W10 shows the row input voltage, waveform W11 shows the column input voltage and waveform W12 shows the resultant or combined signal of W10 and W11 across the picture element. Waveforms W10–W12 maintain the liquid crystal material in a homeotropic state during the selection phase which results in a twisted planar final state for the pixel. Provided below is an example of a voltage sequence applied to a liquid crystal cell as described above. This example is in no way limiting and is exemplary of the improved transition time.

EXAMPLE

A green reflecting sample with PMMA coating was constructed and had the following sequence of voltage signals applied thereto.

| | |
|---|---|
| Preparation phase: | 40 ms, 60 V |
| Post-preparation phase: | 0.2 ms, 6 V |
| Selection phase: | 0.2 ms |
| Evolution phase: | 40 ms, 29 V |

Figure 16:
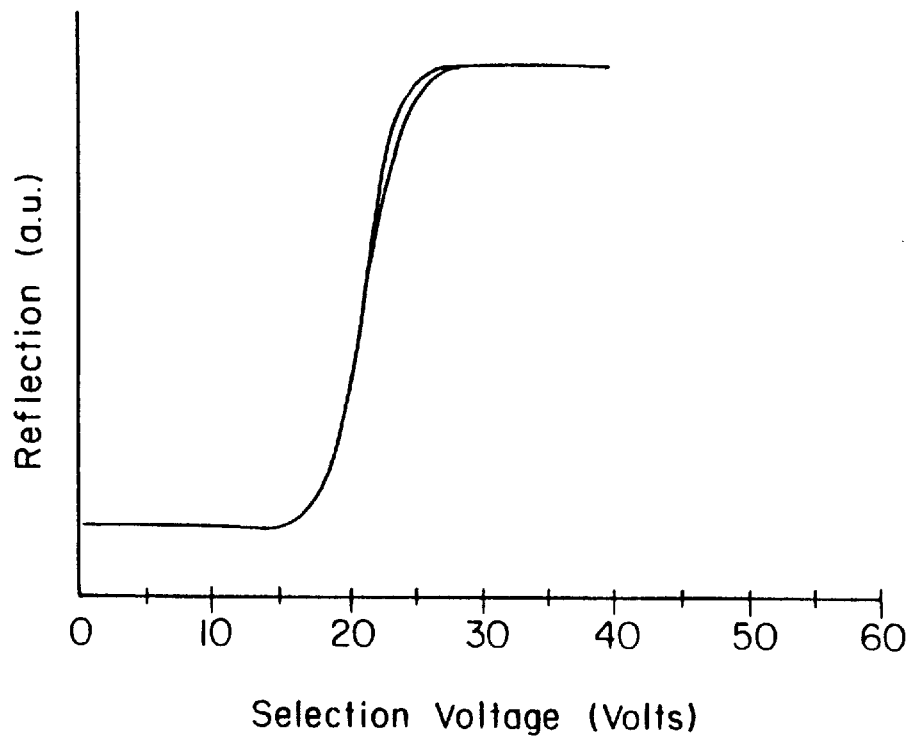
FIG. 16 is a plot showing the effect of varying evolution phase voltages on a final state of a liquid crystal material with respect to varying selection phase voltages.

The final reflection vs. selection voltage graphical representation is shown in FIG. 16. A high reflection value is obtained with a selection voltage higher than 27 V. A low reflection value is obtained with a selection voltage lower than 15 V. As such, gray scales can be obtained with selection voltages in the range of 15 V to 27 V.

Figure 17:
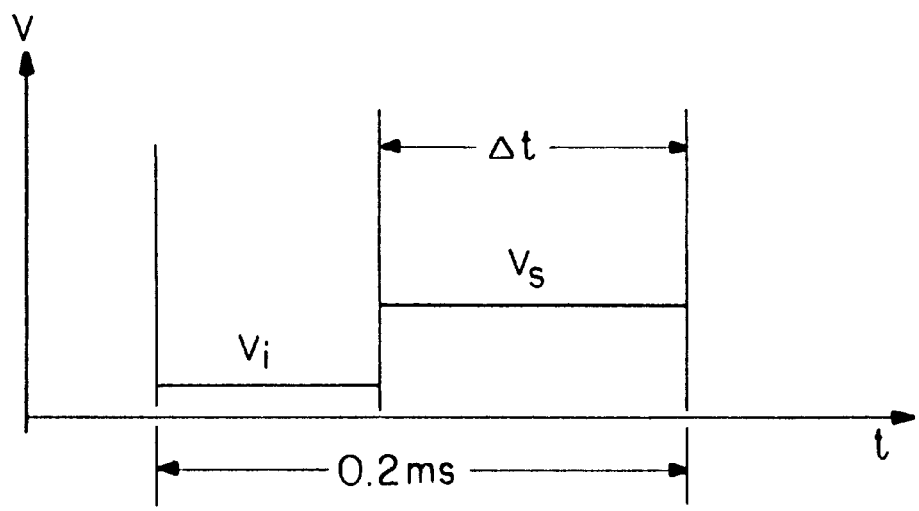
FIG. 17 is a schematic diagram of time-modulation to obtain a gray scale of the liquid crystal material.
Figure 18:
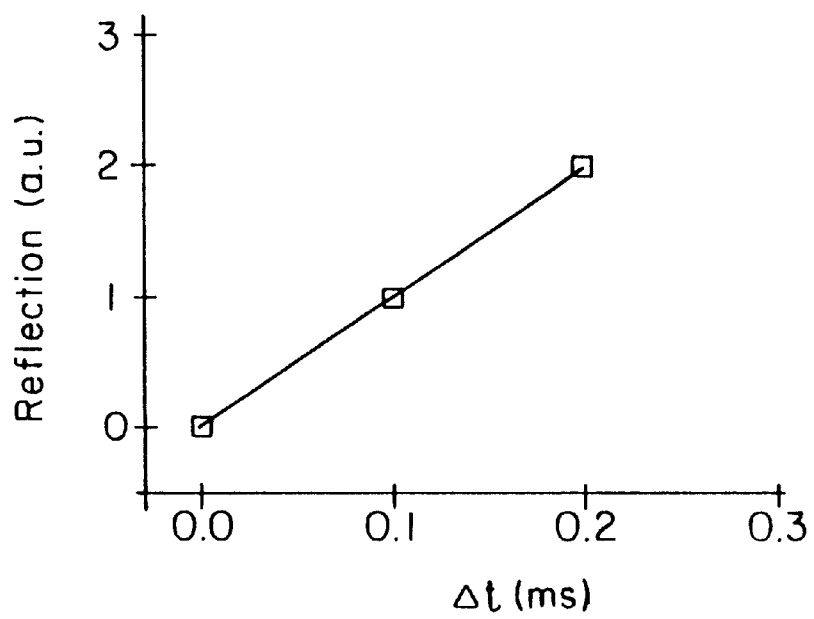
FIG. 18 is a plot of reflection vs. time interval of liquid crystal material using the time-modulation technique shown in FIG. 17.

As seen in FIG. 17, gray scale can also be obtained by using time-modulation techniques. At the beginning of the selection phase, the same voltage as the post-preparation voltage $V_i$ is applied and then a higher voltage $V_s$ is applied for $\Delta t$. When $V_s=35$ V is applied to the above example, the final reflection vs. $\Delta t$ showing the different gray scale values is shown in FIG. 18.

Five Phase Drive Scheme

In this embodiment, it has been found that be adding yet another phase to the addressing sequence that additional time can be saved. In this drive scheme, presented in FIGS. 19A and 19B, an after-selection phase 330 is inserted between the selection phase 318 and the evolution phase 320. By insertion of the after-selection phase, the overall addressing time for the flat panel display can be reduced to about 22 ms.

Figure 19A:
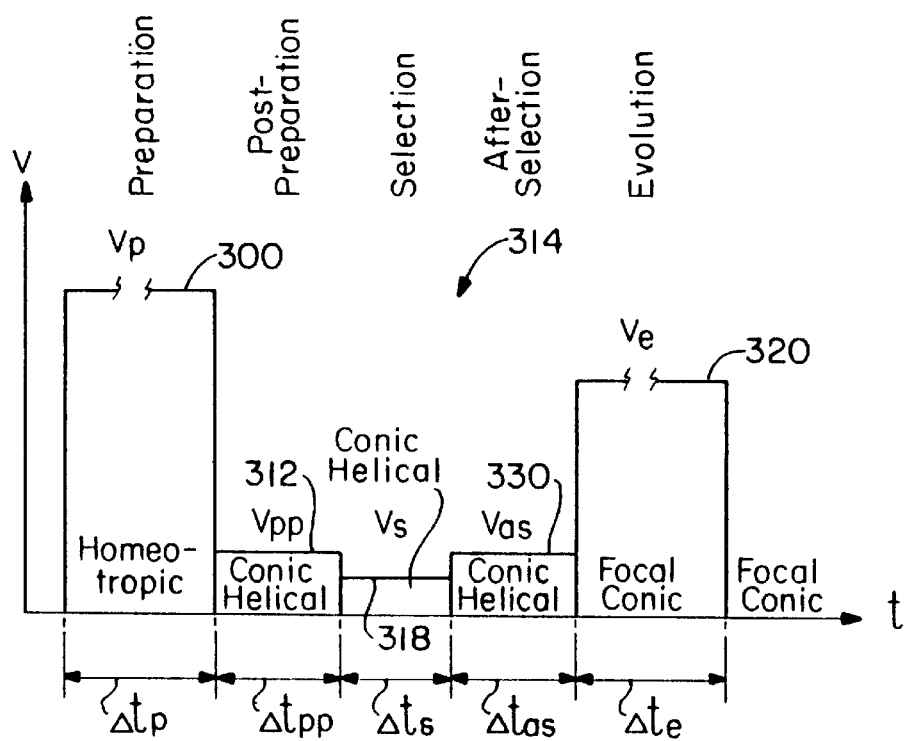
FIGS. 19A and 19B are voltage sequences that are coupled across liquid crystal material to achieve two different liquid crystal display states.
Figure 19B:
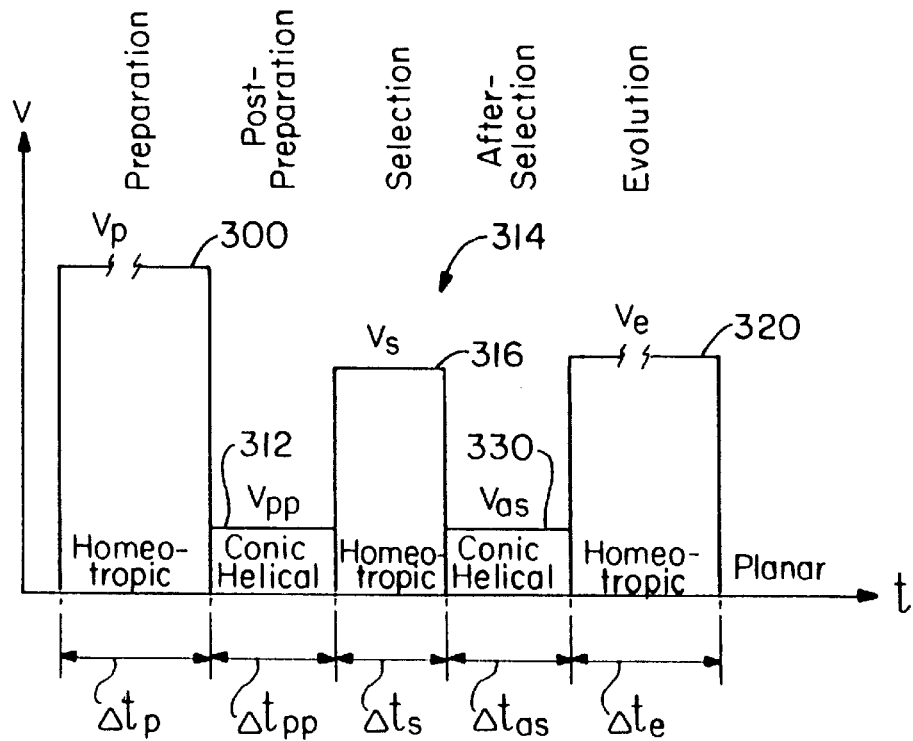

FIGS. 19A and 19B present the display states of a picture element correlated to a root means square (rms) voltage as a function of time across the appropriate electrodes. In a sequence similar to the four phase drive scheme, the preparation phase 300 applies a voltage $V_p$ sufficiently high during $\Delta t_p$ to drive the liquid crystal material to a homeotropic texture which causes the polar angle of the director of the liquid crystal material to rotate to a zero degree position. This applied voltage is primarily provided by a row driver that powers the row electrodes.

In the post-preparation phase 312, the applied voltage $V_{pp}$ is sufficiently low or reduced during $\Delta t_{pp}$ to allow the liquid crystal material to relax. The polar angle of the liquid crystal director exhibits a slight increase in value.

In the selection phase 314, a voltage $V_s$ is applied during $\Delta t_s$ which ultimately determines the final appearance of the liquid crystal material. A high voltage 316 stops the relaxation of the liquid crystal material to a transient planar texture and returns the material back to the homeotropic texture. A low voltage 318 allows the liquid crystal material to continue relaxation to the transient planar texture and the director's polar angle becomes relatively large. Application of the voltage $V_s$ is achieved by combining the voltages generated by the row drivers and a column driver that powers the column electrodes.

In an after-selection phase 330, a voltage $V_{as}$ is applied during $\Delta t_{as}$ and is relatively low. Depending upon the applied voltage $V_s$ the liquid crystal material behaves as follows. If a homeotropic texture is selected in the selection phase 314, then the after-selection phase 330 causes the liquid crystal material to relax toward the transient planar texture slightly. In other words, the polar angle returns to a small non-zero value. However, if the transient planar texture is selected in the selection phase 314, then the after-selection phase 330 almost completely transforms the liquid crystal material to the transient planar texture wherein the director's polar angle is almost 90°. The column driver supplies the voltage $V_{as}$.

In the evolution phase 320 a relatively intermediate voltage $V_e$ is applied. As seen in FIG. 19B, if the liquid crystal material deviates slightly from the homeotropic texture in the after-selection phase 330, then the material is switched back to the homeotropic texture or held in a state slightly deviated from the homeotropic texture. After the evolution phase 320, when the voltage is sufficiently low, the material relaxes to the transient planar texture and then to the stable planar texture. However, as seen in FIG. 19A, if the liquid crystal material relaxes to the transient planar texture in the after-selection phase 330, the liquid crystal material switches to the focal conic texture in evolution phase 320. Accordingly, the liquid crystal material remains in the focal conic texture and the material appears transparent or weakly scattering. The voltage supplied in the evolution phase is supplied mostly from the row driver.

|  | preparation | post-preparation | selection | after-selection | evolution |
|---|---|---|---|---|---|
| voltage (V) | 60 | 8 | 32/48 | 8 | 30 |
| pulse width (ms) | 5 | 0.5 | 0.05 | 0.5 | 15 |
| frequency (Hz) | 1k | 20k | 20k | 20k | 1k |

A 5 μm cell was made with a cholesteric liquid crystal material having a pitch length that reflects yellow light. As set forth in the table above, when the voltage $V_s$ in the selection phase 314 is at or below 32 volts, the focal conic texture is obtained after the evolution phase 320. When the voltage $V_s$ in the selection phase 314 is at or above 48 volts, the planar texture is obtained. The duration $\Delta t_s$ is about 0.05 ms. Of course, these and the other values listed in table may vary according to the liquid crystal material and other factors. It will be appreciated that the voltages applied in this example may either be in the form of square waves or sine waves.

Figure 20:
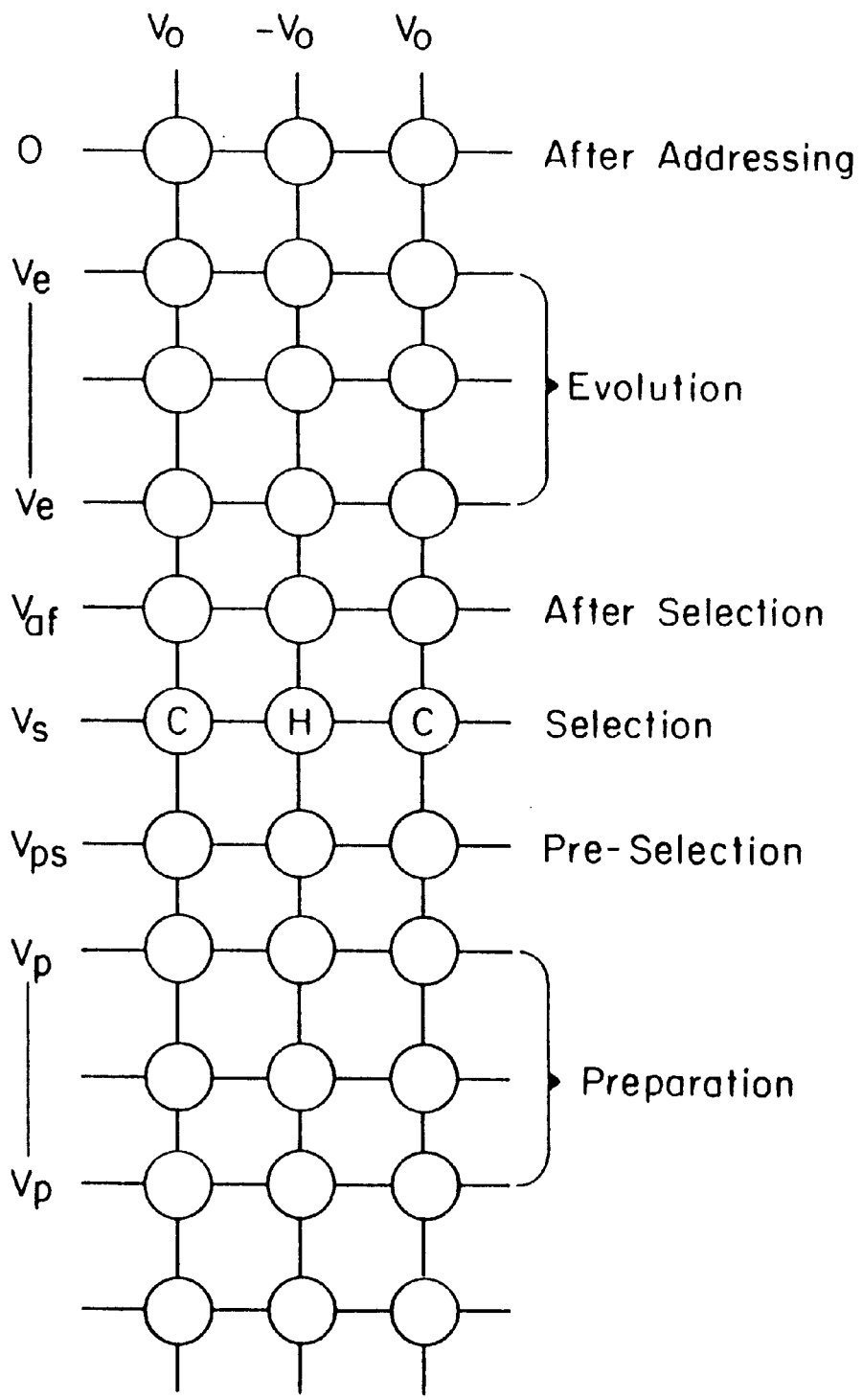
FIG. 20 is a schematic showing arrays of electrodes for controlling the display states of liquid crystal material disposed between the electrodes.

The column and row voltages for the five phase drive scheme are represented in FIG. 20. Throughout the five phases the column voltage is either $V_o$=8V for selecting the conic helical structure as represented by a "C" which will eventually result in the focal conic texture or the column voltage is $-V_o$=-8V for selecting the homeotropic texture as represented by "H" which will eventually result in the planar texture, while the frequency is 20 kHz.

The values of the row voltages vary during the five phases according to the desired texture. In the preparation phase, the row voltage is $V_p$=59.5 V and the frequency is 1 kHz. As those skilled in the art will appreciate that the rms voltage at the pixel between the appropriate row and column electrode is $\sqrt{59.5^2+8^2}$=60V. In the post-preparation phase and the after-selection phase, the applied row voltage is $V_{pp}=V_{as}$=0 V. Therefore, voltage across the pixels in the post-preparation and the after-selection phase is 8 V.

In the selection phase, the frequency of the row voltage is 20 kHz (the same as the column voltage) and the row voltage is (32+48)/2=40V. Accordingly, if the focal conic texture is desired, the column voltage is 8V and the voltage across the pixel is 40−8=32V. If the planar texture is desired, the column voltage is −8V and the voltage across the pixel is 40−(−8)=48V.

In the evolution phase, the row voltage is 29V and is applied at a frequency of 1 kHz. Therefore the rms voltage across the pixels is about 30V. After completion of the five phases, the row voltage is 0V, and the voltage across the pixels after the addressing sequence is 8V with no cross-talking effect.

The five phase drive scheme provides an improvement over other drive schemes by pre-disposing the polar angle of the liquid crystal directors. In the five phase drive scheme, the selection interval is shorter than in the four phase drive scheme. This reduces the overall frame time to address the picture.

Two Phase Drive Scheme

As discussed in the Background Art, the conventional drive scheme for bistable liquid crystal displays addresses one line at a time. To obtain a reflecting appearance with the conventional drive scheme a relatively high voltage is applied to switch the material to the homeotropic texture. Upon removal of the high voltage the material relaxes to the planar texture. To obtain a transparent or weakly scattering appearance an intermediate voltage is applied to switch the material to the focal conic texture. Upon removal of the voltage the material remains in the focal conic texture. The time interval to switch the material to the homeotropic texture can be reduced by applying a higher voltage value to the liquid crystal material. Unfortunately, the time interval for switching the material to the focal conic texture cannot be reduced by applying a higher voltage as this would force the liquid crystal material into the undesired homeotropic texture. With this drive scheme the shortest time interval to address one line is about 20 ms.

Figure 21A:
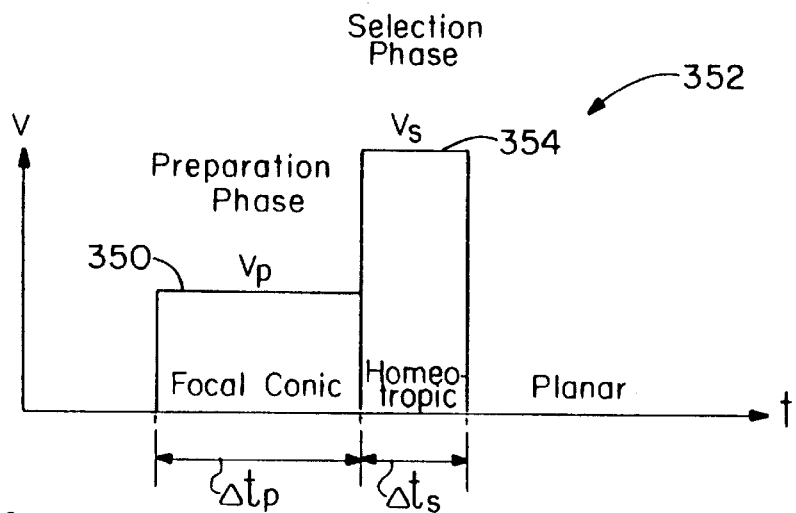
FIGS. 21A and 21B are voltage sequences that are coupled across liquid crystal material to achieve two different liquid crystal display states.
Figure 21B:
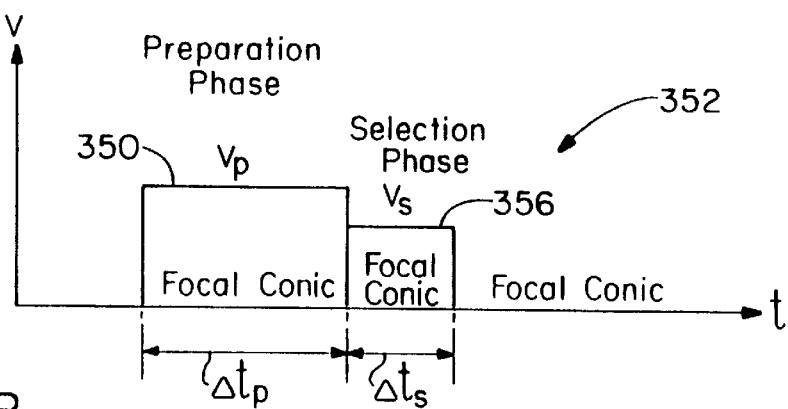
Figure 22:
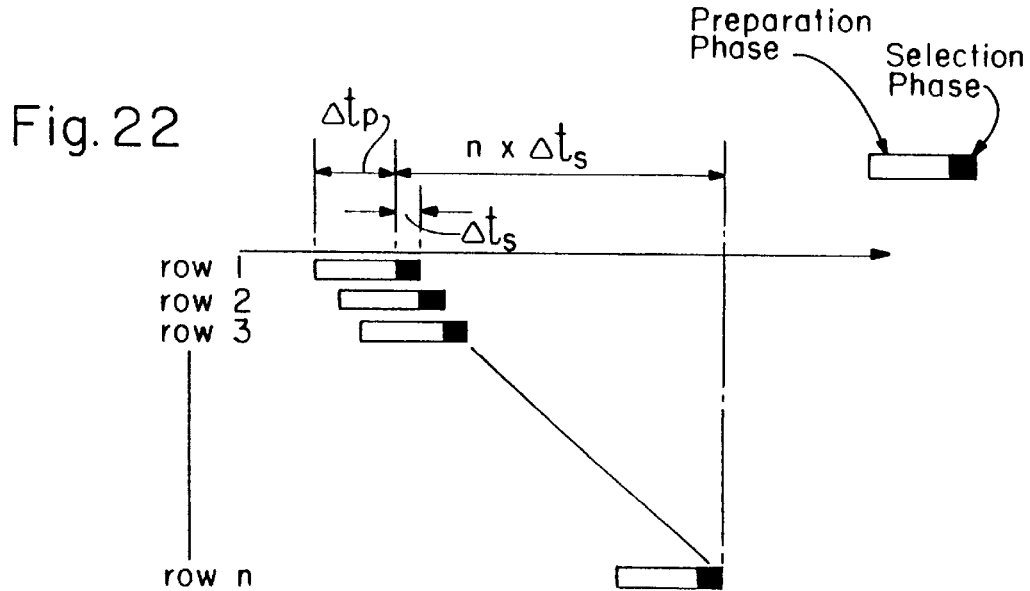
FIG. 22 is a schematic diagram of a pipeline algorithm for a two phase drive scheme.

In the present embodiment and as seen in FIGS. 21A and 21B, the problem of waiting for the liquid crystal material to relax into the desired state is overcome by employing the focal conic texture, as opposed to the homeotropic texture, in the preparation phase. Although the time needed to switch the material to the focal conic texture is about 15 ms, a pipeline algorithm as shown in FIG. 22, can be employed to address many lines simultaneously in the preparation phase. The frame time or the total time to address for n line display is $\Delta t_p+n\Delta t_s$.

In a preparation phase 350, a voltage $V_p$ is applied for a duration $\Delta t_p$ to obtain the focal conic texture. In a selection phase 352, a selection voltage $V_s$ is applied to force the liquid crystal material to its desired final appearance. Application of a relatively high voltage 354 causes the material to attain a homeotropic texture. After the selection phase 352 the homeotropic texture relaxes to the planar texture. Application of a relatively lower voltage 356 causes the material to stay in the focal conic texture which remains after removal of the selection voltage $V_s$.

EXAMPLE

Figure 23:
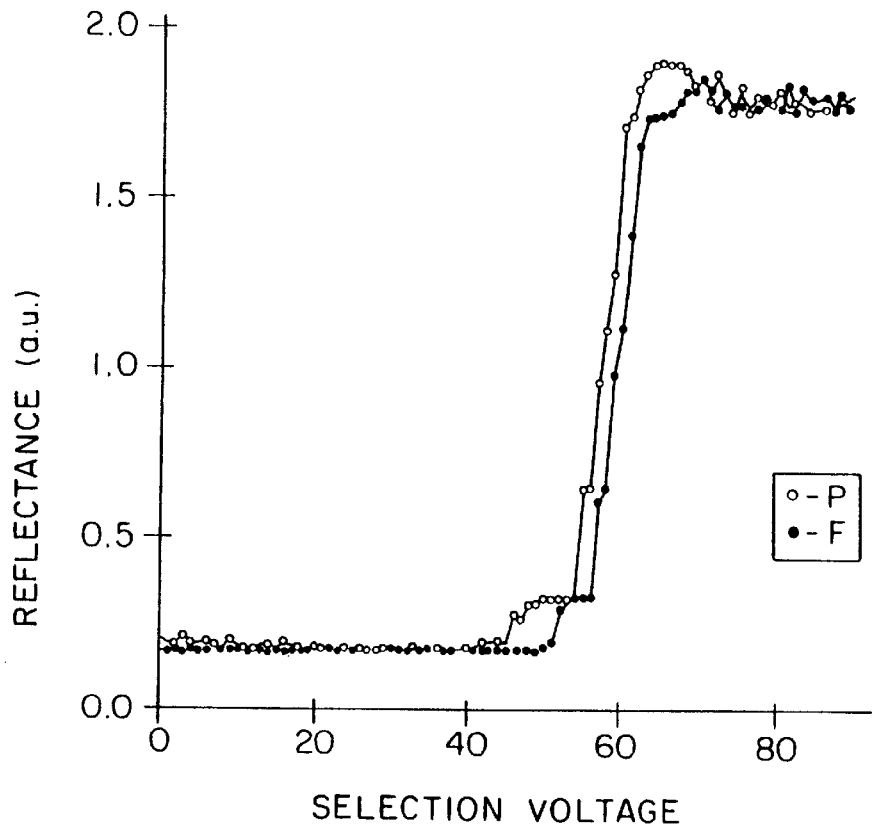
FIG. 23 is a plot of reflection vs. selection voltage according to an exemplary two phase drive scheme.

An exemplary cell was made using cholesteric liquid crystal material BL061/E44 which reflects yellow light. A voltage $V_p$ of about 30V was applied across the pixels for a duration $\Delta t_p$ of about 15 ms. In FIG. 23, the reflectance of the liquid crystal material after the addressing sequence vs. the selection voltage is presented. The open circles with the "P" designator show the reflectance of the material when the initial state—prior to the preparation phase 350—was in the planar texture. The closed circles with the "F" designator show the reflectance of the material when the initial state was in the focal conic texture. In the selection phase 352, which in this example is about 2 ms in duration, the selection voltage 354 is about 63 V to obtain the planar texture and the selection voltage 356 is about 45 V to obtain the focal conic texture.

Figure 24:
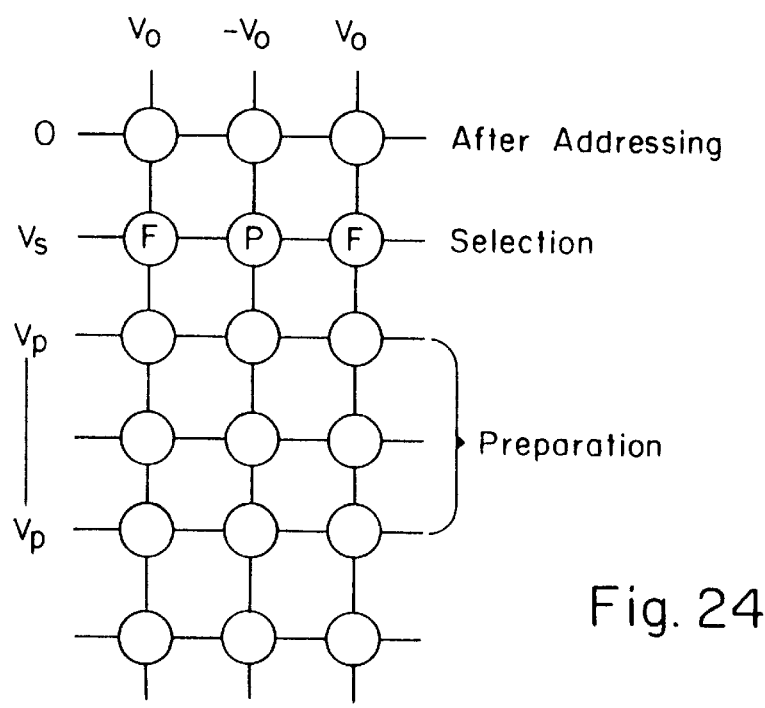
FIG. 24 is a schematic showing arrays of electrodes for controlling the display states of liquid crystal material disposed between the electrodes.

FIG. 24 presents an addressing sequence with the row and column voltages for the present example. In the selection phase, the row voltage is (45+63)/2=54V and the frequency is 1 kHz. To select the focal conic texture, the column voltage is $V_o$=(63−45)/2=9V which results in the voltage across the pixel being (54−9)=45 V. To select the planar texture, the column voltage is −$V_o$=−9V which results in the voltage across the pixel being (54−(−9))=63V. There is no cross-talking effect during the selection phase. The voltage $V_P$ for the preparation phase is about 28.6 V and the frequency is 500 Hz. Therefore, the voltage across the pixels is $\sqrt{28.6^2+9^2}$=30V.

From the above description it can be seen that the two phase drive scheme has at lease two advantages over the other multiple phase drive schemes presented. The total time of the addressing sequence ($\Delta t_p+\Delta t_s$) is about 17 ms, whereas the other addressing sequences can be as long as 80 ms. As such, this drive scheme is quite suitable for video rate operation. Another advantage of this embodiment is that the driving waveform is much simpler than the other multiple phase drive schemes.

The alternative embodiments, as shown and described in FIGS. 11–24, may also include the variations to the first embodiments shown in FIGS. 1–6. Therefore, it is within the scope of the alternative embodiments to incorporate the operational features and the like from the first embodiment and to utilize the circuitry discussed below.

CONTUOL ELECTRONICS

FIG. 7 is a block diagram of a circuit 200 for energizing edge contacts to achieve a specified output from the display 10. The particular display depicted in FIG. 7 is a matrix of 320 by 320 picture elements. This display thus includes 320 rows with each row having 320 individually controllable picture elements.

From the above discussion it is apparent that each row and each column of the display 10 has an contact or connector at the edge of the display for coupling a control voltage to an electrode that extends across the display. The block diagram of FIG. 7 shows the circuits for energizing or driving these edge contacts divided into groups spaced about the outer periphery of the display. A group of row drivers 210 on one side of the display activates edge contacts coupled to the even rows (0,2,4 etc) in the display and a second group of row drivers 212 on the opposite side of the display activates edge contacts coupled to the odd rows (1, 3, 5 etc) of the display. Similarly, a group of column drivers 214 activates the even columns and a second group of column drivers 216 activates the odd columns.

Each of the sets of row and column drivers is electrically connected to a control/logic circuit 220 which controls the presentation of data on the display 10. Data and control signals from the control/logic circuit 220 are presented on two control data busses 222, 224. Data on these two busses is output from two electronically programmable memory circuits 226, 228. Control signals are generated from a logic portion of the circuit 220.

Figure 10:
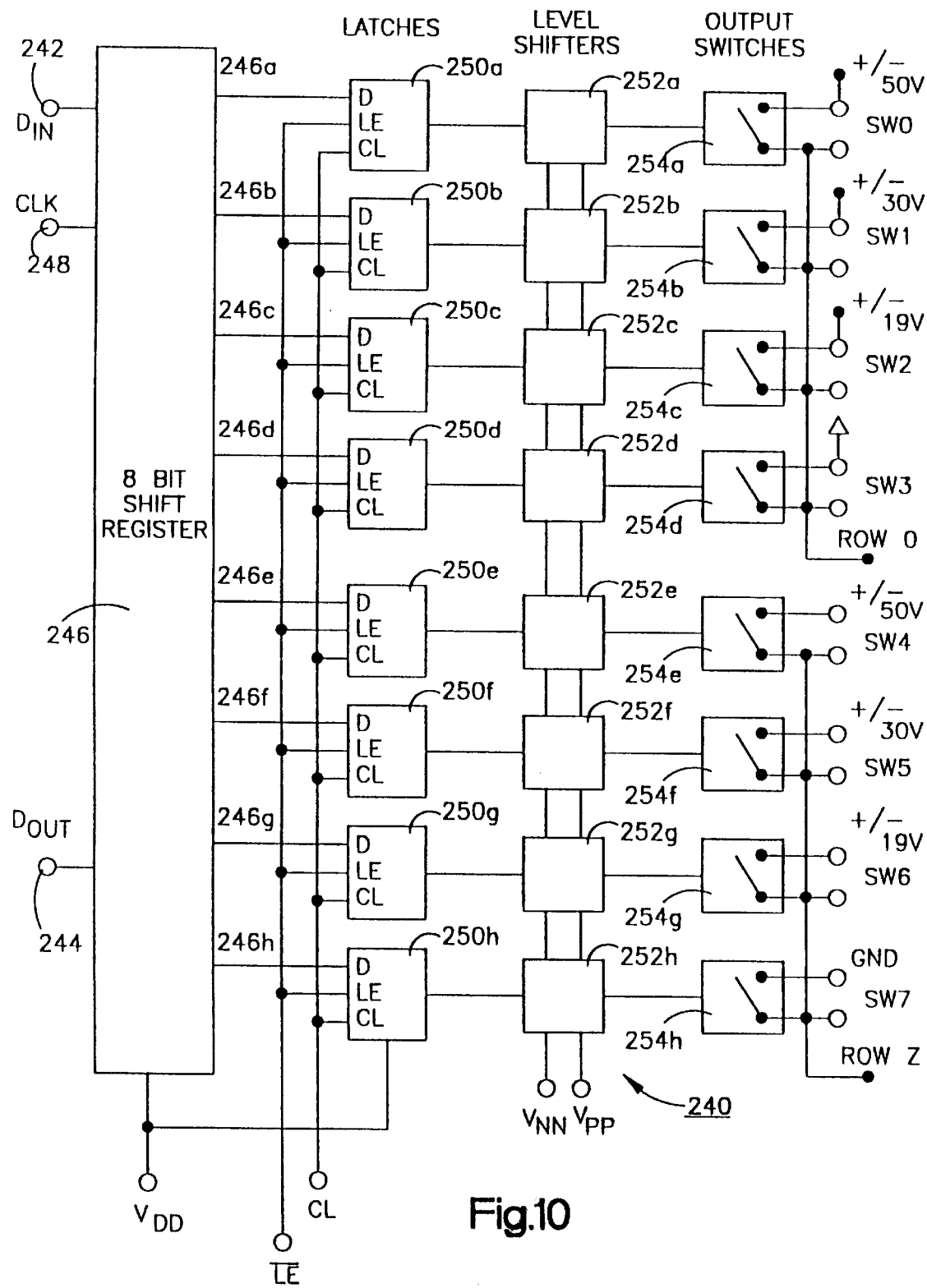
FIG. 10 is a schematic of an analog switch used to construct the display driver circuits.

The row drivers 210 on the left of the display in FIG. 7 is made up of 160 analog switches 240 connected in series. A functional block diagram of one of these switches is depicted in FIG. 10. A preferred analog switch used to construct the row drivers is model HV204 analog switch commercially available from Supertex.

As seen in the functional block diagram of FIG. 10 each analog switch 240 includes a data input 242, a data output 244 and an eight bit shift register 246 for holding data. The data consists of two state data bits. Data at the data input 242 is clocked into the shift register 246 by toggling a clock input 248.

The shift register has eight parallel outputs 246a–246h. Data at these outputs is presented to eight latch circuits 250a–250h. Each of these latch circuits has a clear input CL and a latch enable input NOT LE connected to the control portion of the control/data bus 222. The latch is cleared upon application of a signal to the clear input and latches the data presented at a D input to the latch upon receipt of a load enable signal. The data latched into the latch is presented at an output from the latch and communicated through an associated one of eight level shifters 252a–252h.

Each of the analog switches 240 also includes eight switch or output portions 254a–254h. The status of the latch determines the state of an associated output or switch portion of the analog switch. If the latch contains a high bit the switch output closes and if the latch has a low bit the switch output opens. As a specific example, if the latch 250h has a high bit latched from the shift register, the switch portion 254h connects together two contacts 260, 262 seen in FIG. 10.

To understand how data from the data bus 222 must be clocked through the series connected analog switch circuits 240 one must understand that each of the analog switches 240 has two input pins that are connected to a +/−50 volt waveform, two pins connected to a +/−30 volt waveform, two pins connected to a +/−19 volt waveform and two pins that are grounded. Outputs associated with these four different voltage inputs are coupled together. This is seen in FIG. 10 where one sees that the switch portion 254a is connected to a +/−50 volt signal, the switch portion 254b is connected to a +/−30 volt signal, the switch portion 254c is connected to the +/−19 volt signal and the input to the switch portion 254d is grounded. Also note that the outputs from each of these switch portions are connected together and also connected to row 0 of the display 10.

When the row designated as row 319 (FIG. 7) is to experience the preparation phase 110 the shift register is loaded with a bit pattern that assures a high bit is latched into the latch 250a when the latch enable input is toggled. The outputs to the three latches 250b, 250c, 250d must be low during the preparation phase. Since the display 10 is updated serially from bottom to top as seen if FIG. 7 it is seen that the row energization signals appropriate for a given row will be appropriate for the next row a short time later so the control circuit 220 need only shift the data within a shift register by suitable application of 4 clock signals to each shift register. A series of bits appropriate to achieve twenty preparation cycles, one selection cycle, and then twenty evolution cycles are shifted into a bottommost analog switch 240 and shifted up through all the row drivers by appropriate clocking of the clock inputs to the shift registers. After each clock signal the control 220 causes the latches to simultaneously latch data for appropriate energization of edge contacts. The control 220 co-ordinates the presentation and clocking of data so that the row drivers receives the appropriate data.

At any time during a display update only one row of the 320 rows in the display is energized with a bi-polar selection signal. The state of each pixel (twisted planar or focal conic) in that row is stored in a second electronically controllable memory 228. Each time the row driver configuration changes it is the responsibility of the control circuit 220 to load the correct column data into the two column drivers 214, 216. As seen in FIGS. 5 and 6 the purpose of the column drivers 214, 216 is to control the phase of the +/−8 volt signal for each of the 320 pixels of the row that is experiencing the selection phase.

The preferred column drivers 214, 216 are built using SMOS column driver integrated circuits (identified by part number SED1191f). Each of the two column drivers is built on a circuit board 220 that has +8 volt and −8 volt inputs 270, 272 that drive the column edge contacts such as the representative contacts 70a, 70b, 70c of the display 10.

Figure 8:
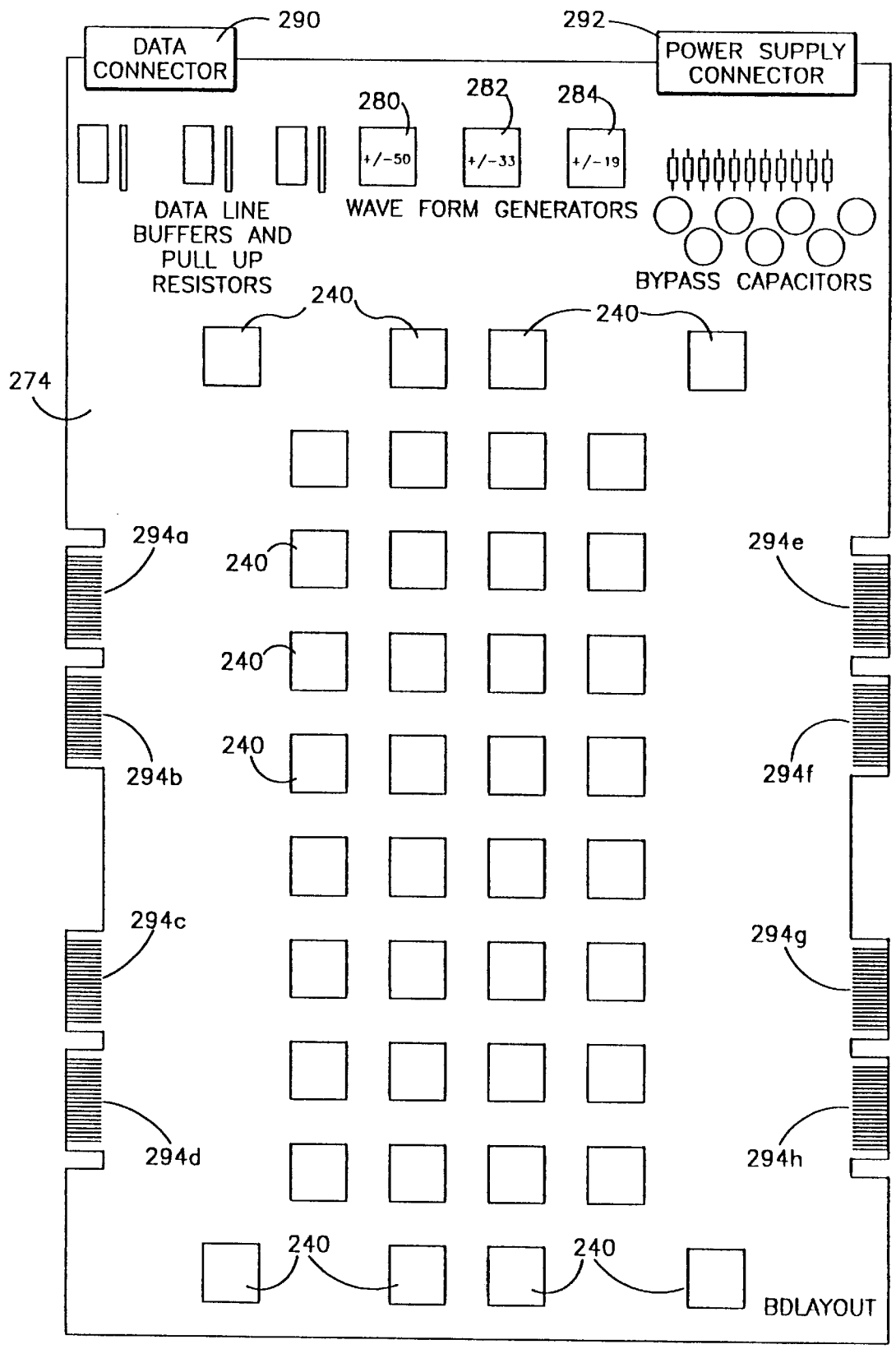
FIGS. 8 and 9 illustrate a board layout of the display drive circuits shown in block diagram form in FIG. 7.
Figure 9:
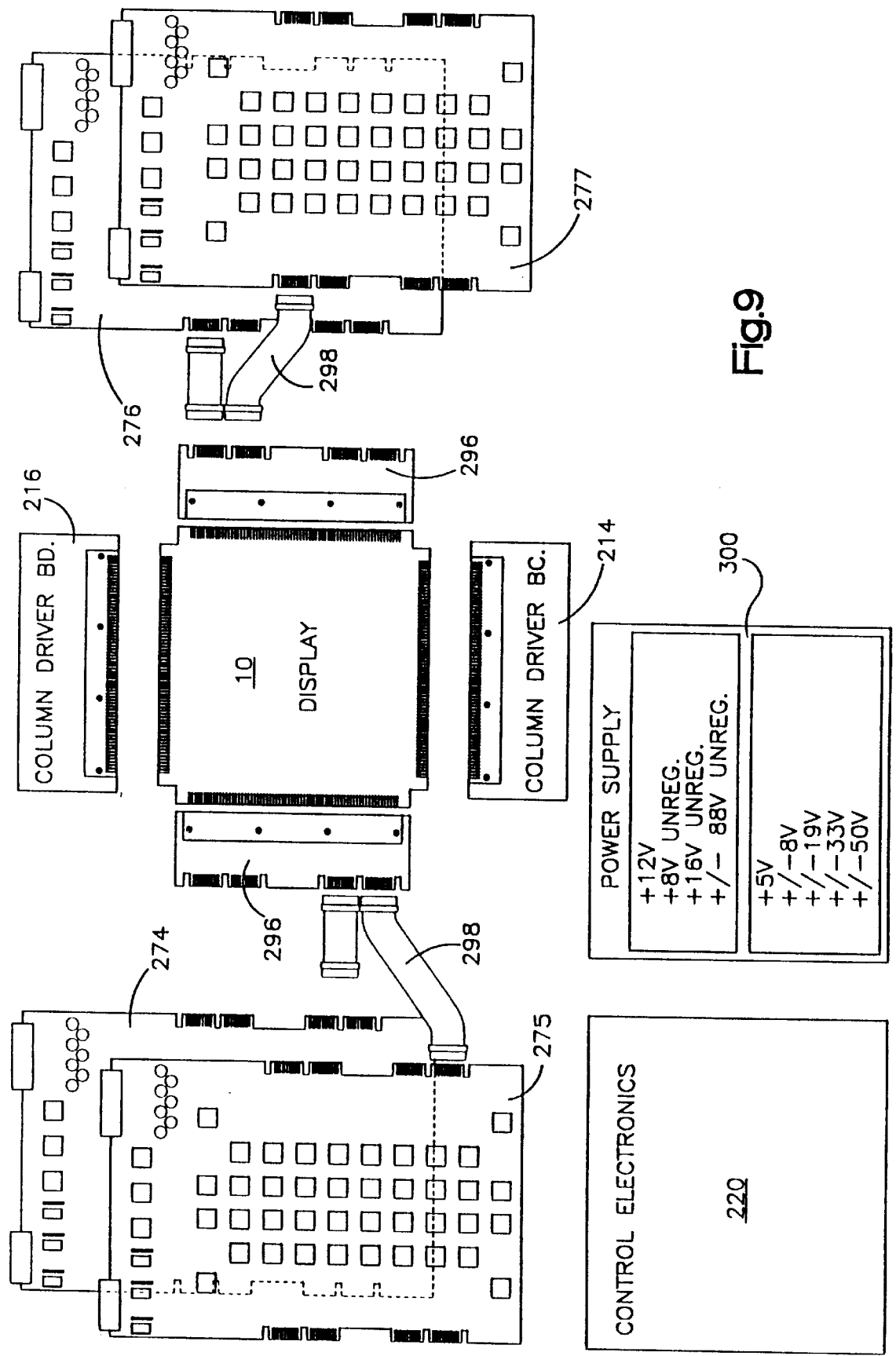

A layout of a row driver printed circuit board 274 supporting forty of the analog switches 240 is shown in FIG. 8. Since the row drivers 210 require 160 such analog switches, the drivers 210 are made up from four circuit boards 274, 275, 276, 277 (FIG. 9).

The circuit board depiction in FIG. 8 includes three analog switches 280, 282, 284 that are waveform generators for providing bi-polar signals to the other forty analog switches on the circuit board 274. The analog switch 280 provides a square wave bi-polar (+/−) 50 volt signal that is connected to each of the analog switches 240. The analog switch 282 provides a bi-polar (+/−) 30 volt signal and the analog switch 284 provides a bi-polar (+/−) 19 volt signal.

The square wave output from the waveform generators is achieved by coupling one positive and one negative voltage of the appropriate magnitude to two analog switch inputs and connecting together the outputs associated with those inputs. By appropriate adjustment of the data clocked into the shift register of the analog switch circuit the bi-polar output from the switch is provided.

The circuit board 274 includes a number of input and output connectors for interfacing. One connector 290 connects to the control and data bus 222 to supply control and data signals to the board. A power supply connector 292 provides the appropriate power signals to the board from a regulated power supply 300 shown in FIG. 9. Edge connectors 294a–294h on opposite sides of the board output row drive signals to a transition printed circuit board 296 (FIG. 9) that multiplexes the row drive signals to an appropriate row electrode of the display 10. As an example, the connector 294a supplies twenty signals for driving twenty rows of the display. These twenty signals are coupled to a flexible multi-conductor printed circuit cable 298 having contacts at one end to engage one of the connectors 294a–294h. An opposite end of the cable 298 has contacts that engage a connector on the transition printed circuit board 296.

The circuitry for the column drivers is mounted to the two printed circuit boards 214, 216. These circuit boards not only support the circuitry for applying an appropriate phase signal to the pixels across a row in the display undergoing the selection phase, but also includes the circuitry for routing the signals from the circuits to the edge contacts of the display 10.

The column driver boards 214, 216 each include three SMOS 1191f display driver integrated circuits and necessary capacitors, resistors, level translators and an analog switch that serves as a ground switch. Each of the SMOS circuits has its own data input from the 8 bit parallel data bus 224. Each clock pulse of the column board driver boards gathers a byte of data so that each of the six driver integrated circuits gets one data bit on each clock signal. Since of the integrated circuits has 64 outputs, it requires 64 data bytes on the bus 224 to completely configure a row. Thus as the selection phase reaching each new row, 64 bytes of column data is loaded into the driver boards 214, 216 to control the appropriate phase of the +/−8 volt square wave signal output from the boards 214, 216.

It is appreciated that although the invention has been described with a degree of particularity, it is the intention that the invention include all modifications or alterations from the disclosed design falling within the spirit or scope of the appended claims.

What is claimed is:

1. A method of addressing a bistable chiral nematic liquid crystal material disposed between electrodes arranged on opposed sides of said liquid crystal and adapted to selectively apply an electric field through said liquid crystal material, said method comprising the steps of:

energizing said electrodes to establish a preparation voltage across said liquid crystal during a preparation phase;

energizing said electrodes to establish a post-preparation voltage across said liquid crystal during a post-preparation phase;

energizing said electrodes to establish a selection voltage across said liquid crystal during a selection phase for selecting a selection state which evolves into one of two final display states for said liquid crystal; and energizing said electrodes to establish an evolution voltage across said liquid crystal during an evolution phase and creating an evolution state which changes to one of two final display states after completion of the addressing method, wherein said final display states remain indefinitely until said energizing steps are repeated.

2. The method according to claim 1 wherein after said evolution phase, the evolution voltage to said electrodes is reduced to allow said liquid crystal to exhibit one of its final display states.

3. The method according to claim 1 wherein after said evolution phase, the voltage to said electrodes is removed to allow said liquid crystal to exhibit one of its final display states.

4. The method according to claim 1 wherein said liquid crystal is a chiral nematic liquid crystal and said preparation voltage is of a magnitude, and said preparation phase is of a duration sufficient to homeotropically align said liquid crystal material.

5. The method according to claim 4 wherein said preparation phase is up to about 40 ms in duration.

6. The method according to claim 1 wherein said liquid crystal is a chiral nematic liquid crystal and the magnitude of said selection voltage is selected to either maintain said liquid crystal in a homeotropic texture or to permit said liquid crystal to initiate a transition to a transient twisted planar texture.

7. The method according to claim 1 wherein said selection phase is about 0.2 ms in duration.

8. The method according to claim 1 wherein said liquid crystal is a chiral nematic liquid crystal and said selection voltage is of a magnitude sufficient to establish one of a focal conic or a twisted planar final display state.

9. The method according to claim 1 wherein said liquid crystal is a chiral nematic liquid crystal and said evolution voltage is of a magnitude, and said evolution phase is of a duration effective to maintain liquid crystal that is in a homeotropic texture in said homeotropic texture, and to allow liquid crystal in a transient twisted planar texture to evolve to a focal conic texture during said evolution phase, and wherein said evolution voltage is the same for obtaining either final display state.

10. The method according to claim 1 wherein said liquid crystal is a chiral nematic liquid crystal and said evolution voltage is of a magnitude, and said evolution phase is of a duration effective to allow liquid crystal in a transient twisted planar texture to relax to a focal conic texture, and to allow liquid crystal in a homeotropic texture to remain in the homeotropic texture during the evolution phase and afterward to a reflecting twisted planar texture.

11. The method according to claim 1 wherein said liquid crystal is a chiral nematic liquid crystal and said preparation phase includes modulating said preparation voltage on and off to shorten the duration of said preparation phase.

12. The method according to claim 1 wherein said liquid crystal is a chiral nematic liquid crystal having a pitch length in said twisted planar texture effective to reflect light in the visible spectrum.

13. The method according to claim 1 wherein said liquid crystal is a chiral nematic crystal material and the magnitude of said post-preparation voltage is of a magnitude to relax said liquid crystal material from a homeotropic texture to a transient planar texture, wherein said post-preparation phase is of a duration about 0.2 ms.

14. The method according to claim 1 further comprising the step of energizing said electrodes to establish an after-selection voltage across said liquid crystal during an after-selection phase after said selection phase to adjust the polar angle of the liquid crystal material.

15. The method according to claim 14 wherein said liquid crystal material is a chiral nematic and wherein said selection voltage places said liquid crystal material in one of a homeotropic or a transient planar texture.

16. The method according to claim 1 wherein said step of energizing said electrodes includes the step of time modulating said electrodes during said selection phase to cause said liquid crystal material to exhibit gray scale properties.

17. The method according to claim 1 wherein said step of energizing said electrodes includes the step of amplitude modulating said electrodes during said selection phase to cause said liquid crystal material to exhibit gray scale properties.

18. A method for displaying information comprising the steps of:
   a) providing a layer of bistable liquid crystal material and arranging electrodes on opposed sides of the liquid crystal material to form an array of display elements;
   b) coupling the electrodes to a drive circuit for energizing the electrodes to selectively activate the display elements of the array to one of a first and a second final display state; and
   c) addressing selected display elements of the array by sequentially energizing the liquid crystal material at a selected display element location with a preparation signal during a preparation phase, reducing the preparation signal to a post-preparation signal during a post-preparation phase, adjusting the post-preparation signal to a selection signal for selecting a desired final display state during a selection phase, changing the selection signal across the display element to an evolution signal during an evolution phase which creates a state which can change to one of two final display states for each display element after completion of the addressing step, wherein said final display state remains indefinitely until said addressing steps are repeated.

19. The method of claim 18 wherein the first final display state is a twisted planar texture of the liquid crystal material and the second final display state is a focal conic texture of the liquid crystal material.

20. The method of claim 18 further comprising the step of providing a layer of chiral nematic liquid crystal material having a pitch length effective to reflect light in the visible spectrum, and wherein said evolution voltage is the same for obtaining either final display state.

21. The method of claim 18 further comprising the step of arranging said electrodes on one side of the liquid crystal layer in generally parallel rows and electrodes on an opposite side of the liquid crystal layer in generally parallel columns substantially orthogonal to said rows, whereby said display elements are defined by the points on said rows and columns at which said rows and columns would intersect when in the same plane, and further wherein a plurality of rows of display elements are simultaneously in said preparation phase.

22. The method according to claim 18 further comprising the step of arranging said electrodes on one side of the liquid crystal layer in generally parallel rows and electrodes on an opposite side of the liquid crystal layer in generally parallel columns substantially orthogonal to said rows, whereby said display elements are defined by the points on said rows and columns at which said rows and columns would intersect when in the same plane, and further wherein a plurality of rows of display elements are simultaneously in said evolution phase.

23. The method of claim 18 wherein the step of addressing further includes the step of applying an after-selection signal prior to said evolution signal across the display element.

24. The method of claim 23 wherein said after-selection signal includes the step of adjusting a polar angle of the liquid crystal material to hasten attainment of the final display state.

25. The method according to claim 18 wherein said step of addressing said display elements during said selection phase includes the step of time modulating said selection voltage to cause said liquid crystal material to exhibit gray scale properties.

26. The method according to claim 18 wherein said step of addressing said display elements during said selection phase includes the step of a multitude modulating said selection voltage to cause said liquid crystal material to exhibit gray scale properties.

27. A display apparatus comprising:
   a) a layer of bistable liquid crystal material;
   b) multiple electrodes spaced on opposite sides of the liquid crystal layer for applying selected activation voltages across multiple picture elements of the liquid crystal layer; and
   c) control electronics for sequentially setting a display state of multiple picture elements of the liquid crystal layer comprising circuitry for:
      i) applying a preparation signal across a selected picture element during a preparation phase;
      ii) applying a post-preparation across said selected picture element during a post-preparation phase;
      iii) applying a selection signal across said selected picture element during a selection phase to select a selection state which evolves into one of two final display states; and
      iv) applying an evolution signal across said selected picture element during an evolution phase and creating an evolution state which changes to one of two final display states after completion of the applying steps, wherein said final display state remains indefinitely until said energizing steps are repeated.

28. The apparatus of claim 27 wherein the control electronics comprises circuitry for applying bipolar preparation, post-preparation, selection and evolution signals to the multiple picture elements and wherein said evolution voltage is the same for obtaining either final display state.

29. The apparatus of claim 27 wherein electrodes on one side of the liquid crystal layer are arranged in generally parallel rows and electrodes on an opposite side of the liquid crystal layer are arranged in generally parallel columns substantially orthogonal to said rows and said picture elements are defined by the points on said rows and columns at which said rows and columns would intersect when in the same plane, wherein when the control electronics applies a voltage signal to a row electrode, all picture elements in that row are electrically connected to the same voltage signal and when the control electronics applies a voltage signal to a column electrode, all picture elements in that column are connected to the same voltage signal.

30. The apparatus of claim 27 wherein the control electronics includes a timer to control the timer durations of the preparation, post-preparation, selection and evolution signals.

31. The apparatus of claim 29 wherein the control electronics includes circuitry for applying said preparation and said evolution signals to a plurality of rows of said picture elements.

32. The apparatus of claim 29 wherein said control electronics includes circuitry for simultaneously applying said selection signal to a plurality of rows of said picture elements.

33. The apparatus of claim 27, wherein said control electronics circuitry pre-disposes said layer of bistable chiral nematic liquid crystal material to a state different than said predetermined final display state during said selection phase.

34. The apparatus of claim 27, wherein said control electronics applies an after-selection signal across said selected picture element during an after-selection phase to hasten attainment of said display state.

35. The apparatus of claim 34, wherein said control electronics further comprises circuitry for applying said after-selection signal to the multiple picture elements and a timer to control the duration of said after-selection signal.

36. The apparatus of claim 27, wherein said control electronics time modulates application of said selection signal so that said predetermined final display state exhibits gray scale properties.

37. The apparatus of claim 27, wherein said control electronics amplitude modulates application of said selection signal so that said predetermined final display state exhibits gray scale properties.

38. A method of addressing a bistable liquid crystal material disposed between electrodes arranged on opposed sides of said liquid crystal and adapted to selectively apply an electric field through said liquid crystal material, said method comprising the steps of:

energizing said electrodes to establish a preparation voltage across said liquid crystal material during a preparation phase;

energizing said electrodes to establish a selection voltage across said liquid crystal material during a selection phase for selecting one of two final display states for said liquid crystal; and permitting said liquid crystal to exhibit the final display state without further energizing said electrodes, wherein at least one of the final display states is different than a preparation state of the liquid crystal material during said selection phase and creating a state which changes to one of two final display states after completion of the addressing method, wherein said final display state remains indefinitely until said energizing steps are repeated.

39. The method of claim 38 wherein said bistable liquid crystal material is chiral nematic.

40. The method of claim 39 wherein said chiral nematic liquid crystal material has a pitch length effective to reflect light in the visible spectrum.

41. The method of claim 38 wherein said step of establishing said preparation voltage causes said liquid crystal material to exhibit a focal conic texture.

42. The method of claim 38 wherein said step of establishing said selection voltage causes said liquid crystal material to exhibit one of a focal conic texture or a homeotropic texture.

43. The method of claim 38 wherein said step of permitting includes the step of removing said selection voltage from a cross said electrodes and allowing said liquid crystal material to exhibit one of its final display states, wherein said selection voltage causes said liquid crystal material to attain one of a focal conic texture or a homeotropic texture and said removing step causes said liquid crystal material that is in a focal conic texture to remain in the focal conic texture and causes said liquid crystal material that is in a homeotropic texture to exhibit a planar texture.

44. A method for displaying information comprising the steps of:

a) providing a layer of bistable liquid crystal material and arranging electrodes on opposed sides of the liquid crystal material to form an array of display elements;

b) coupling the electrodes to a drive circuit for energizing the electrodes to selectively activate the display elements of the array to one of a first and a second final display state; and c) addressing selected display elements of the array by sequentially energizing the liquid crystal material at a selected display element location with a preparation signal during a preparation phase, providing a selection signal for selecting a desired final display state during a selection phase, and then allowing the display element to exhibit the desired final display state without further energizing said electrodes and creating a state which can change to one of two final display states after completion of the addressing steps, wherein said final display state remains indefinitely until said addressing steps are repeated.

45. The method of claim 44 wherein the first final display state is a twisted planar texture of the liquid crystal material and the second final display state is a focal conic texture of the liquid crystal material and further comprising the step of providing a layer of chiral nematic liquid crystal material having a pitch length effective to reflect light in the visible spectrum.

46. The method of claim 44 further comprising the step of arranging said electrodes on one side of the liquid crystal layer in generally parallel rows and electrodes on an opposite side of the liquid crystal layer in generally parallel columns substantially orthogonal to said rows, whereby said display elements are defined by the points on said rows and columns at which said rows and columns would intersect when in the same plane, and further wherein a plurality of rows of display elements are simultaneously in said preparation phase.

47. The method according to claim 44 further comprising the step of arranging said electrodes on one side of the liquid crystal layer in generally parallel rows and electrodes on an opposite side of the liquid crystal layer in generally parallel columns substantially orthogonal to said rows, whereby said display elements are defined by the points on said rows and columns at which said rows and columns would intersect when in the same plane, and further wherein a plurality of rows of display elements are simultaneously in said evolution phase.

48. A display apparatus comprising:
a) a layer of bistable liquid crystal material;
b) multiple electrodes spaced on opposite sides of the liquid crystal layer for applying selected activation voltages across multiple picture elements of the liquid crystal layer; and
c) control electronics for sequentially setting a display state of multiple picture elements of the liquid crystal layer comprising circuitry for:
  i) applying a preparation signal across a selected picture element during a preparation phase to cause the liquid crystal layer to exhibit a preparation texture; and
  ii) applying a selection signal across said selected picture element during a selection phase to select a predetermined final display state wherein at least one of the predetermined final display states is different than the preparation texture of the liquid crystal material during said selection phase and creating a state which can change to one of two final display states after completion of the addressing method without further energizing said selected picture element, wherein said final display state remains indefinitely until said applying steps are repeated.

49. The apparatus of claim 48 wherein the control electronics comprises circuitry for applying bipolar preparation and selection signals to the multiple picture elements.

50. The apparatus of claim 48 wherein electrodes on one side of the liquid crystal layer are arranged in generally parallel rows and electrodes on an opposite side of the liquid crystal layer are arranged in generally parallel columns substantially orthogonal to said rows and said picture elements are defined by the points on said rows and columns at which said rows and columns would intersect when in the same plane, wherein when the control electronics applies a voltage signal to a row electrode, all picture elements in that row are electrically connected to the same voltage signal and when the control electronics applies a voltage signal to a column electrode, all picture elements in that column are connected to the same voltage signal.

51. The apparatus of claim 48 wherein said control electronics includes circuitry for simultaneously applying said selection signal to a plurality of rows of said picture elements.

52. The apparatus of claim 48, wherein said control electronics circuitry pre-disposes said layer of bistable chiral nematic liquid crystal material to a state different than said predetermined final display state during said selection phase.

* * * * *

UNITED STATES PATENT AND TRADEMARK OFFICE
CERTIFICATE OF CORRECTION

PATENT NO. : 6,154,190
DATED : November 28, 2000
INVENTOR(S) : Deng-Ke Yang, Yang-Ming Zhu, and Xiao-Yang Huang It is certified that error appears in the above-identified patent and that said Letters Patent is hereby corrected as shown below:

Column 3,
Line 34, delete the "." after the word "is".

Column 4,
Line 32, delete the word "were" and substitute therefor -- where --.

Column 5,
Line 63, delete "i.e." and substitute therefor -- i.e. --.

Column 7,
Line 10, delete the word "pattered" and substitute therefor -- patterned --.

Column 9,
Line 4, delete the word "THERR" and substitute therefor -- THREE --; delete the word "DUIVE" and substitute therefor -- DRIVE --.

Column 14,
Line 45, delete the letter "e" and substitute therefor --$\Theta$--.

Column 17,
Line 21, insert the word --
*Example* --.

Column 19,
Line 14, delete the word "lease" and substitute therefor -- least --;
Line 36, delete the word "CONTUOL" and substitute therefor -- CONTROL --;
Line 37, delete the word "an" and substitute therefor -- a --.

Column 24,
Line 37, delete the words "a multitude" and substitute therefor -- amplitude --.

UNITED STATES PATENT AND TRADEMARK OFFICE
CERTIFICATE OF CORRECTION

PATENT NO. : 6,154,190
DATED : November 28, 2000
INVENTOR(S) : Deng-Ke Yang, Yang-Ming Zhu, and Xiao-Yang Huang It is certified that error appears in the above-identified patent and that said Letters Patent is hereby corrected as shown below:

Column 26,
Line 13, delete the words "a cross" and substitute therefor -- across --.

Signed and Sealed this

Eleventh Day of December, 2001

*Attest:*

*Attesting Officer*

NICHOLAS P. GODICI
*Acting Director of the United States Patent and Trademark Office*